US010163573B1

(12) United States Patent
Devoe

(10) Patent No.: US 10,163,573 B1
(45) Date of Patent: Dec. 25, 2018

(54) CAPACITOR ASSEMBLIES, ENERGY STORAGE MODULES AND ASSEMBLIES, AND METHODS OF MAKING SAME

(71) Applicant: Presidio Components. Inc., San Diego, CA (US)

(72) Inventor: Alan Devoe, La Jolla, CA (US)

(73) Assignee: Presidio Components. Inc., San Diego, CA (US)

( * ) Notice: Subject to any disclaimer, the term of this patent is extended or adjusted under 35 U.S.C. 154(b) by 51 days.

(21) Appl. No.: 14/934,404

(22) Filed: Nov. 6, 2015

(51) Int. Cl.
| | | |
|---|---|---|
| *H01G 2/00* | (2006.01) | |
| *H01G 5/019* | (2006.01) | |
| *H01G 5/06* | (2006.01) | |
| *H01G 4/228* | (2006.01) | |
| *H01G 9/10* | (2006.01) | |
| *H05K 5/03* | (2006.01) | |
| *H01G 4/38* | (2006.01) | |
| *H01G 2/14* | (2006.01) | |
| *H01G 5/017* | (2006.01) | |
| *H01G 13/00* | (2013.01) | |
| *H01G 4/04* | (2006.01) | |

(52) U.S. Cl.
CPC ............... *H01G 4/38* (2013.01); *H01G 4/04* (2013.01); *H01G 4/228* (2013.01); *H01G 13/00* (2013.01)

(58) Field of Classification Search
CPC .. H01G 4/00; H01G 4/38; H01G 2/14; H01G 4/015; H01G 4/30; H01G 5/16; H01G 5/38; H01G 5/06; H01G 9/10
USPC ..... 361/299.1, 321.1, 328, 15, 275.2, 275.4, 361/274.2, 278, 299.2, 298.4, 275.1, 361/275.3, 520, 274.1; 307/43
See application file for complete search history.

(56) References Cited

U.S. PATENT DOCUMENTS

| 3,231,701 A | 1/1966 | Craig |
| 4,107,759 A | 8/1978 | Shirn et al. |

(Continued)

FOREIGN PATENT DOCUMENTS

CN        202957146 U    5/2013

OTHER PUBLICATIONS

Electrical Resistivity of Binary Alloy Systems, 3.3. Copper-Gold Alloy System, J. Phys. Chem. Ref. Data, vol. 12, No. 2, 1983.

(Continued)

*Primary Examiner* — Eric Thomas
*Assistant Examiner* — Arun Ramaswamy
(74) *Attorney, Agent, or Firm* — Wood Herron & Evans LLP

(57) ABSTRACT

A capacitor assembly includes a capacitor having ends. A terminal covers less than an area of one end. A wire bond has opposing ends with one end being coupled to the terminal and is configured to break connection with a circuit when an electrical current through the wire bond reaches a fusing current. An energy storage module includes at least two capacitor assemblies. The wire bond of one capacitor is electrically connected to the second terminal of an adjacent capacitor. An energy storage assembly includes two energy storage modules stacked one on top of the other. A pulse forming network includes conductors and at least two energy storage modules. A method of making a module includes charging each of the capacitors, removing each capacitor that fails, connecting one end of a wire bond to one terminal and connecting the other end to an adjacent capacitor or to a conductor.

38 Claims, 23 Drawing Sheets

(56) References Cited

U.S. PATENT DOCUMENTS

| | | | |
|---|---|---|---|
| 4,186,417 A | 1/1980 | Grahame | |
| 4,193,106 A | 3/1980 | Coleman | |
| 4,680,670 A | 7/1987 | Chan | |
| 6,452,776 B1 | 9/2002 | Chakravorty | |
| 7,164,573 B1 | 1/2007 | Prymak | |
| 7,678,497 B2 | 3/2010 | Horie et al. | |
| 2009/0310280 A1* | 12/2009 | Prymak | H01G 4/228 |
| | | | 361/328 |
| 2011/0043036 A1 | 2/2011 | Weir | |
| 2012/0079693 A1 | 4/2012 | Bultitude et al. | |

OTHER PUBLICATIONS

U.S. Patent and Trademark Office, Office Action in corresponding U.S. Appl. No. 15/645,117 dated Sep. 7, 2018.

* cited by examiner

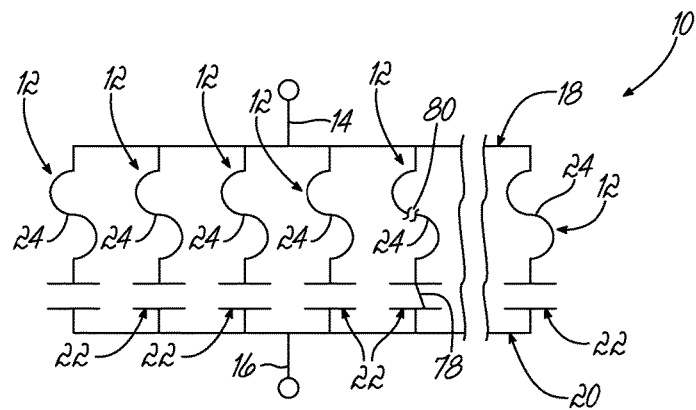
FIG. 11
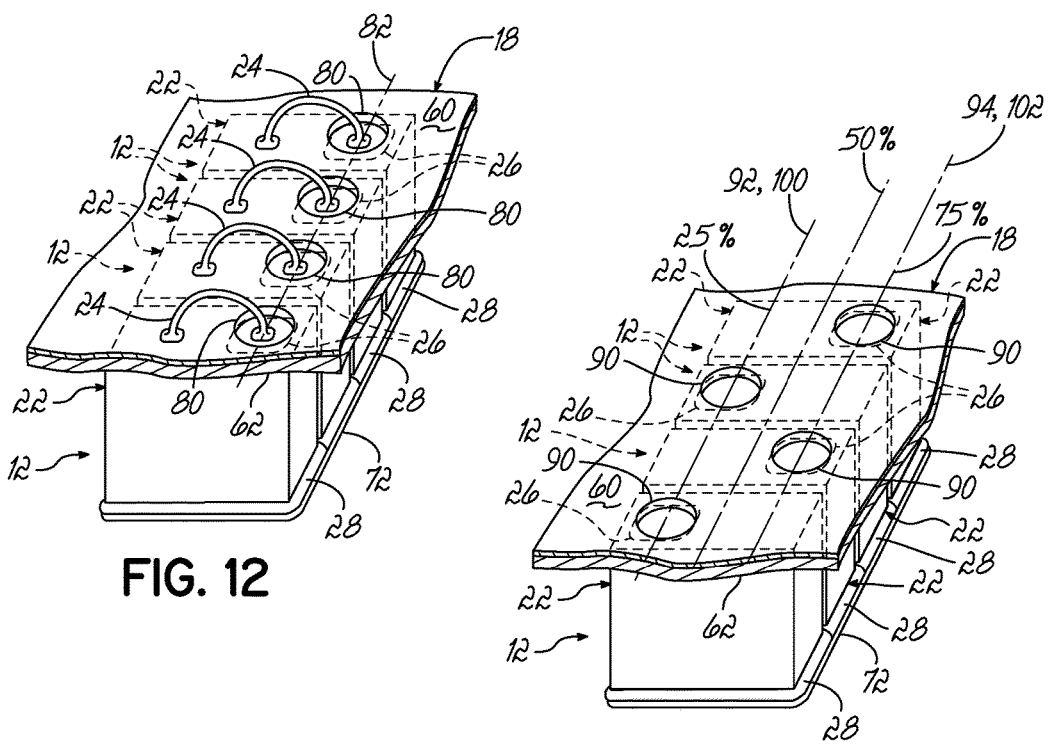
FIG. 12
FIG. 13

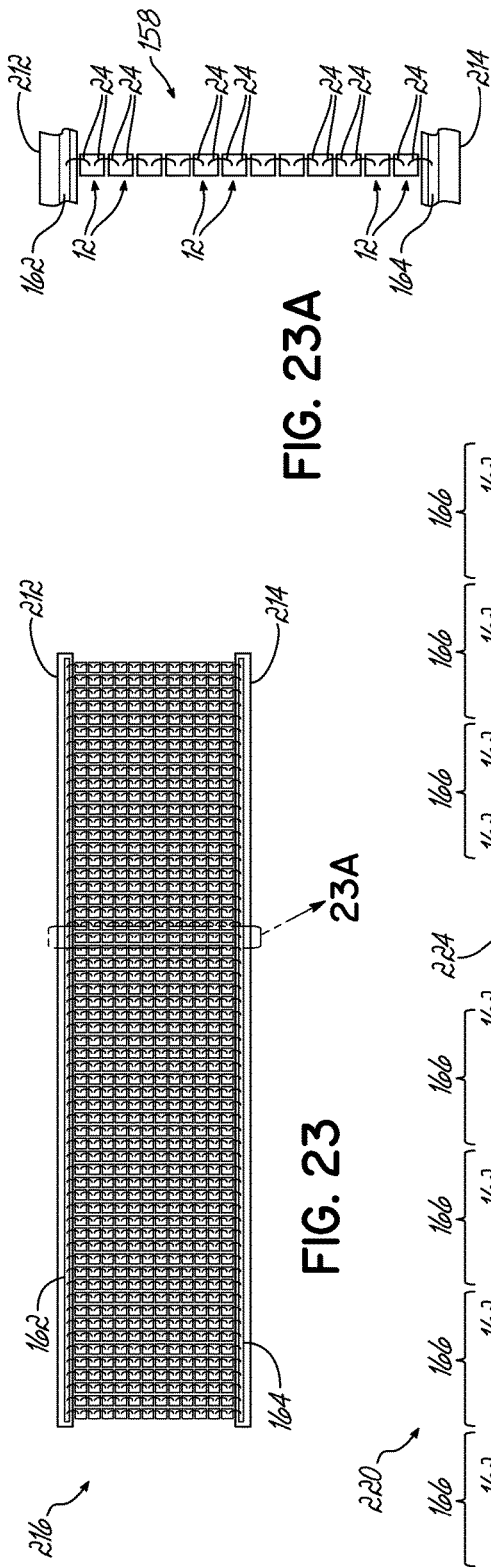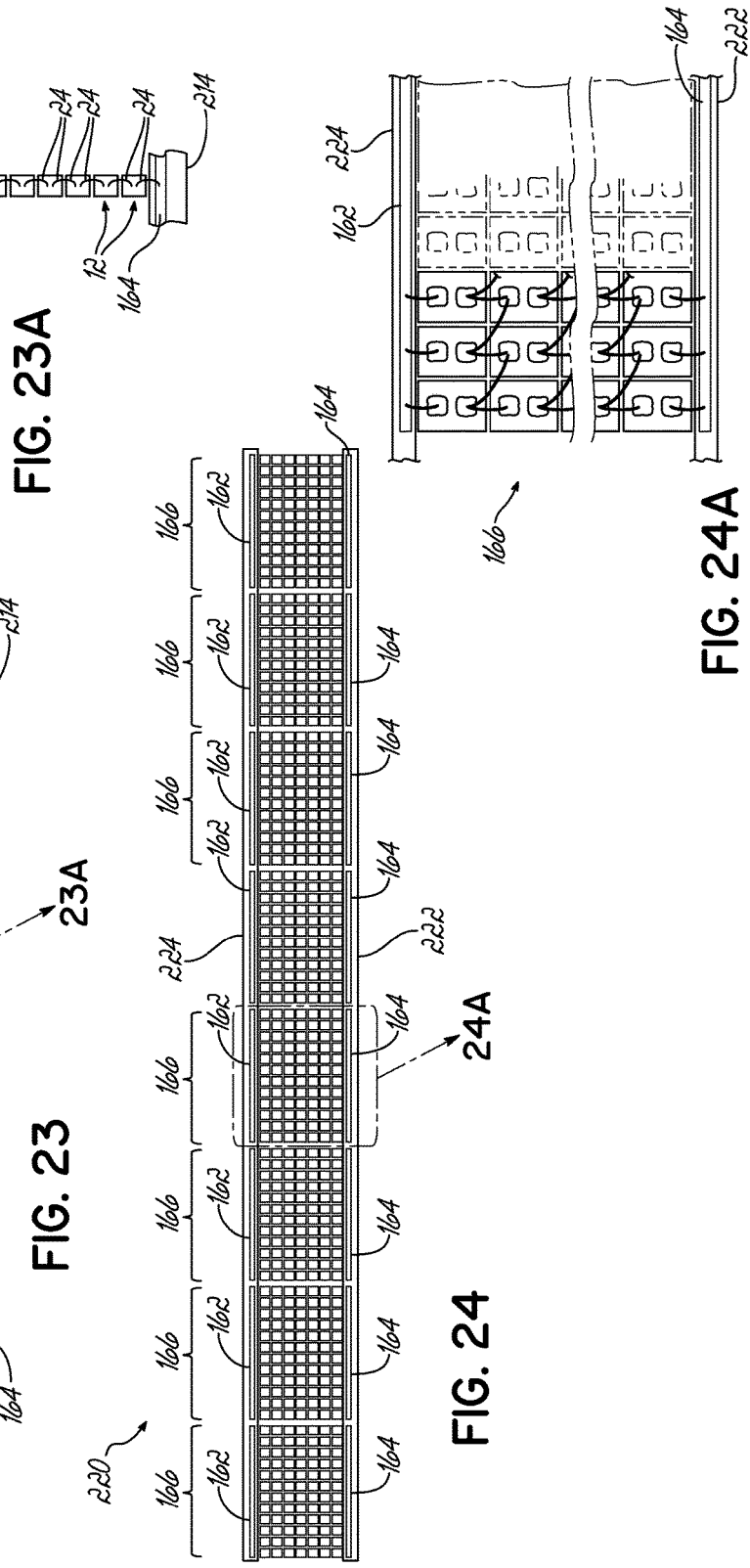

CAPACITOR ASSEMBLIES, ENERGY STORAGE MODULES AND ASSEMBLIES, AND METHODS OF MAKING SAME

TECHNICAL FIELD

The present invention relates generally to capacitor assemblies and, more particularly, to energy storage modules utilizing capacitor assemblies, assemblies of energy storage modules, and to methods of making capacitor assemblies, energy storage modules, and energy storage assemblies.

BACKGROUND

Multilayer capacitors, which are often referred to as "chips," are commonly used for bypass, coupling, or energy storage applications in electronic circuits. The capacitor includes internal parallel plates and a dielectric body, which may be made of a ceramic. Alternating parallel plates are connected by respective terminations. Each of the end terminations may then be electrically coupled to corresponding plates and provide an external electrical connection to the multilayer capacitor.

Ceramic capacitors may be electrical power sources for many applications. The most common applications are in consumer electronics. While being generally reliable for these applications, ceramic capacitors tend to suffer catastrophic failure when utilized in high power, rapid discharge applications. At catastrophic failure, the capacitor ceases to function. For ceramics, this is typically the result of dielectric breakdown that creates a short circuit between any two of the opposing internal plates. When a capacitor short circuits, uncontrolled electrical flow through the capacitor may damage other electrical components in the circuit. The capacitor at that point is useless and may also render the attached electrical circuit inoperative. Because ceramic capacitors may be generally unreliable in high power, rapid discharge, they are not often used in those applications. In applications where high power, rapid discharge, and high reliability are required, polymer capacitors are favored.

In a polymer capacitor, the polymer is the dielectric. Polymer capacitors are advantageous in a number of respects. They may be made with very large areas from large films or sheets of the polymer. For example, polymer capacitors may have hundreds of square feet of polymer in one capacitor. In addition, the polymer dielectric has a high voltage capability and generally does not fail catastrophically. These characteristics enable polymer capacitors having both high-energy density and high reliability to be economically made.

Due to the demanding nature of the high-energy storage applications, and to be a commercially viable alternative, ceramic capacitors are needed that are capable of storing large amounts of energy and that have large energy density. Because energy stored is a function of the charged voltage squared of the capacitor, high voltage capability, for example, up to or in excess of 10 kV, is needed. In addition, capacitor assemblies are needed which are reliable under rapid charging and discharging of large amounts of stored energy. There is a desire to be able to choose a ceramic capacitor for high energy storage because ceramic capacitors can discharge more quickly than other types of capacitors, such as, polymer capacitors.

SUMMARY OF THE INVENTION

The present invention overcomes the foregoing and other shortcomings and drawbacks of electrical power sources and methods for manufacturing those devices heretofore known for use in electronics and other environments. While the invention will be described in connection with certain embodiments, it will be understood that the invention is not limited to these embodiments. On the contrary, the invention includes all alternatives, modifications and equivalents as may be included within the spirit and scope of the present invention.

According to one aspect of the present invention, a capacitor assembly comprises a capacitor that has a first end and a second end opposing the first end. A first terminal covers less than a total area of the first end. A second terminal is placed on one of the first end and the second end. A wire bond has opposing ends with one end being electrically coupled to the first terminal. The wire bond is configured to break connection with an electrical circuit when an electrical current through the wire bond reaches a fusing current.

In one embodiment, the first terminal is made of a first conductive material and the second terminal is made of a second conductive material that is different than the first conductive material.

In one embodiment, the first terminal is made of gold or an alloy including gold and the second terminal does not include gold.

In one embodiment, at least the first terminal is free of solder.

In one embodiment, the capacitor has at least one external side extending between the first and second ends and the second terminal covers the second end and extends on to the at least one external side of the capacitor.

In one embodiment, the capacitor has at least one external side extending between the first and second ends, and a margin is formed between the first terminal and the at least one external side. The margin is free of electrically conductive material.

In one embodiment, the wire bond is made of gold or an alloy including gold.

In one embodiment, the wire bond has a substantially circular cross-section having a diameter of about 50 microns or less.

In one embodiment, the wire bond is free-floating between the first terminal and the electrical connection to the electrical circuit.

In one embodiment, the wire bond has a region of increased resistance. The wire bond is configured to separate at the region of increased resistance. In one embodiment, the region of increased resistance includes a reduced cross-sectional area. In one embodiment, the region of increased resistance includes an area of increased strain.

In one embodiment, the wire bond is made of a first conductive material and the first terminal is made of a second conductive material different than the first material.

In one embodiment, the capacitor includes at least one dielectric layer and at least two electrodes that are separated by the dielectric layer. At least one of the electrodes is exposed at the first end. The other electrode is exposed at the second end. The second terminal is electrically coupled to the other electrode on the second end.

In one embodiment, the capacitor includes at least one dielectric layer and at least two electrodes that are separated by the dielectric layer. Each of the electrodes is exposed at the first end. The second terminal is electrically coupled to the other electrode on the first end.

In one embodiment, the capacitor is capable of containing at least 0.001 Joules of energy when charged to 1,000V.

In one embodiment, the capacitor is from about 0.08 inch by about 0.05 inch to about 0.22 inch by about 0.20 inch.

According to another aspect of the present invention, and in one embodiment, an energy storage module comprises at least one hundred capacitor assemblies spaced apart side to side less than 0.005 inch. The energy storage module further includes a first main conductor, each of the wire bonds being directly coupled to the first main conductor, and a second main conductor, each of the second terminals of the capacitor assemblies being directly coupled to the second main conductor.

According to another aspect of the present invention, and in one embodiment, an energy storage module comprises at least two capacitor assemblies. The wire bond of one capacitor assembly is electrically connected to the second terminal of an adjacent capacitor assembly.

According to another aspect of the present invention, and in one embodiment, an energy storage module comprises at least two capacitor assemblies. The energy storage module further includes a first main conductor, each of the wire bonds being directly coupled to the first main conductor. The energy storage module further includes a second main conductor, each of the second terminals of the capacitor assemblies is directly coupled to the second main conductor.

In one embodiment, the at least two capacitor assemblies each have at least one external side extending between the respective first and second ends thereof and the at least one external side of one capacitor assembly is in direct contact with the at least one external side of the other capacitor assembly.

In one embodiment, the at least two capacitor assemblies each have at least one side extending between the respective first and second ends thereof and the side of one capacitor assembly is spaced apart from the side of an adjacent capacitor assembly by from about 0.0005 inch to about 0.005 inch.

In one embodiment, the first main conductor includes a plate having a first side and a second side, the wire bond for each of the capacitor assemblies being directly coupled to the second side.

In one embodiment, the plate includes a channel that extends through the thickness thereof from the first side to the second side and the wire bond for each of the capacitor assemblies extends through the channel and is directly connected to the second side.

In one embodiment, the plate includes at least two spaced apart openings that each extend through the thickness thereof from the first side to the second side and the wire bond for each of the capacitor assemblies extends through a respective opening and is directly connected to the second side.

In one embodiment, the capacitor assemblies are arranged in a row and adjacent ones of the at least two spaced apart openings are arranged in a row that is parallel to the row of capacitor assemblies.

In one embodiment, the capacitor assemblies are arranged in a row with respective first terminals of adjacent capacitor assemblies being offset from one another and adjacent ones of the at least two spaced apart holes are offset from one another to match the offset arrangement of the first terminals.

In one embodiment, the energy storage module further comprises a layer of porous, non-conductive material in direct contact with at least the first main conductor. In one embodiment, the layer of non-conductive material is a layer of non-conductive ceramic fibers.

In one embodiment, the energy storage module further comprises a dielectric fluid and the capacitor assemblies and the first main conductor are submerged in the dielectric fluid.

According to another aspect of the present invention and in one embodiment, an energy storage assembly comprises at least two energy storage modules that are stacked one on top of the other.

In one embodiment, the energy storage assembly further comprises a dielectric fluid and a container for holding the dielectric fluid. The at least two energy storage modules are submerged in the dielectric fluid.

In one embodiment, the at least two energy storage modules are separated by a layer of porous, non-conductive material.

In one embodiment, the at least two energy storage modules are electrically connected together in series in an electrical circuit.

According to another aspect of the present invention, and in one embodiment, a pulse forming network comprises a first primary conductor, a second primary conductor; and at least two energy storage modules. The first main conductor of each energy storage module is electrically connected to the first primary conductor, and the second main conductor of each energy storage module is electrically connected to the second main conductor.

According to another aspect of the present invention, and in one embodiment, a method of making an energy storage module comprises manufacturing a plurality of capacitors. Each capacitor includes at least one dielectric layer, at least two electrodes that are separated by the dielectric layer, and a first terminal and a second terminal that electrically connect the electrodes with one of the first terminal and the second terminal. The method further includes charging each of the plurality of capacitors to a predetermined voltage and removing each capacitor that fails. For each of the remaining capacitors, the method further includes connecting one end of a wire bond to the first terminal and connecting the other end of each wire bond to an adjacent capacitor or to a main conductor of the energy storage module.

In one embodiment, charging includes applying a DC bias to each of the capacitors.

In one embodiment, following charging, the method further comprises discharging the predetermined voltage from each multilayer capacitor in less than 5 microseconds.

In one embodiment, discharging includes discharging the predetermined voltage at a rate of at least about 100 volts per microsecond.

In one embodiment, discharging includes discharging the predetermined voltage at a rate of at least about 300 volts per microsecond.

In one embodiment, the method further comprises repeating charging and discharging at least ten times. In one embodiment, charging and discharging occur at approximately the same rate.

BRIEF DESCRIPTION OF THE DRAWINGS

The accompanying drawings, which are incorporated in and constitute a part of this specification, illustrate embodiments of the invention and together with the detailed description given below, serve to explain various aspects of the invention.

FIG. 11 is a schematic representation of the module shown in FIG. 9;

FIG. 12 is a perspective view of one embodiment of the invention depicting openings along one axis in a top conductor plate;

FIG. 13 is a perspective view of one embodiment of the invention depicting openings staggered along two axes in a top conductor plate;

FIG. 23 is a plan view of a pulse forming network according to one embodiment of the invention;

FIG. 23A is an enlarged view of the encircled area 23A in FIG. 23;

FIG. 24 is a plan view of a pulse forming network according to one embodiment of the invention;

FIG. 24A is an enlarged view of the encircled area 24A in FIG. 24;

DETAILED DESCRIPTION

With reference generally to the figures, embodiments of the present invention include energy storage devices. As is described below, these devices may include individual capacitor assemblies that are arrayed or otherwise grouped together to form modules. The modules themselves may be used to store energy or be electrically connected to other modules to form larger energy storage devices and energy storage networks. Further, modules may be electrically connected in parallel or in series so as to construct customized devices for a particular application. In this way, devices capable of storing and supplying large quantities of electrical energy may be constructed from smaller modular units. As is described below, each modular unit according to embodiments of the invention is capable of storing electrical energy while also being a reliable source of that electrical energy.

It is contemplated, for example, that embodiments of the present invention may be capable of storing 10,000 volts (V); 40,000 V; 80,000 V, and even as high as 400,000 V. At these voltage levels, embodiments of the present invention may be utilized to supply energy in power hungry applications including, for example, grid energy storage and energy storage for transportation applications, to name only a few. Furthermore, embodiments of the present invention may be utilized where rapid discharge of large amounts of electrical energy is required, such as, in military applications. While high voltage, high energy applications may be described herein, embodiments of the present invention may be utilized in relatively low voltage, though high energy applications. These applications may include those requiring voltages on the order of 1,000V but requiring about 4 Joules.

To enable these applications, embodiments of the present invention advantageously have large energy density (measured in joules per cubic centimeter (J/cc)) while also being reliable sources of energy. For example, it is contemplated that ceramic capacitors capable of about 1 J/cc may be useful, while lower energy densities of about 0.3 J/cc when combined with large total energy storage may also be useful. High energy densities in the range of about 1-3 J/cc or 2-8 J/cc are also envisioned with a goal of 8-10 J/cc or about 20 J/cc or higher being possible. As is described below, large energy density may be achieved by use of relatively small capacitors, and reliability may be realized by wire bonding each individual capacitor.

Figure 1:
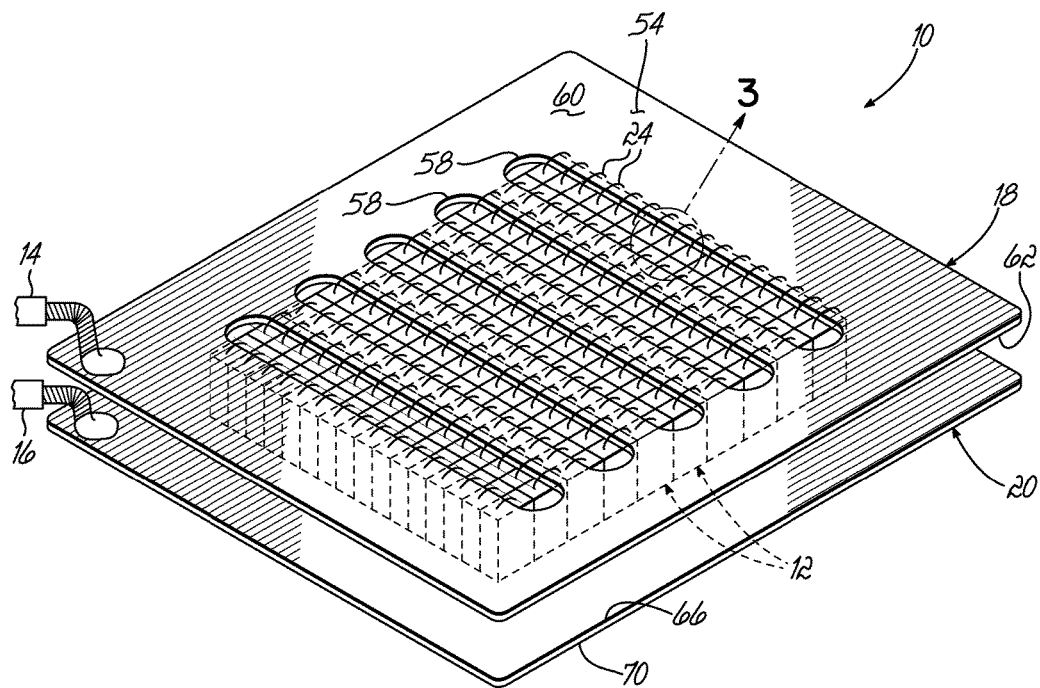
FIG. 1 is a perspective view of a module according to one embodiment of the present invention.
Figure 2:
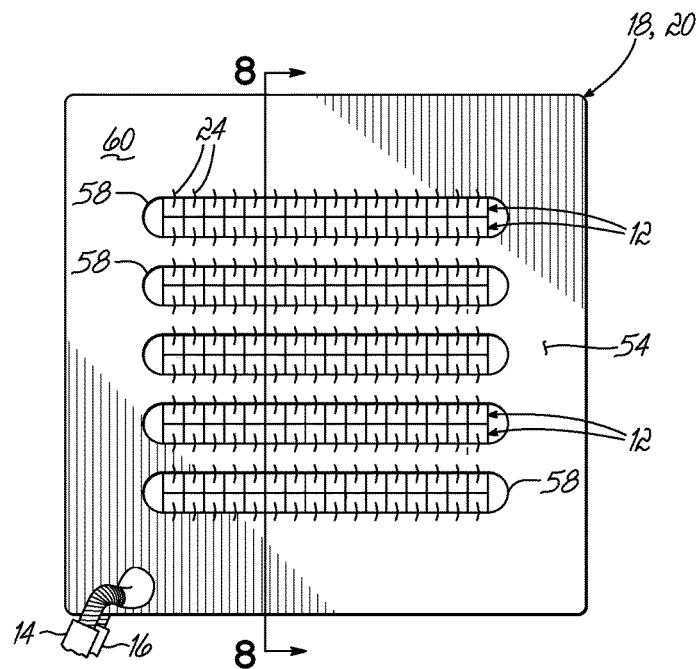
FIG. 2 is a top plan view of the module shown in FIG. 1.

To these and other ends, in an exemplary embodiment shown in FIGS. 1 and 2, an energy storage module 10 includes a plurality of capacitor assemblies 12 electrically connected together. As shown, the energy storage module 10 may be electrically connected to an electrical circuit (not shown) via electrical leads 14, 16. Each capacitor assembly 12 may be electrically connected to a top main conductor 18 and electrically connected to a bottom main conductor 20. In embodiments of the present invention, the capacitor assembly 12 is the smallest unit from which a variety of larger modules may be then constructed.

Figure 3:
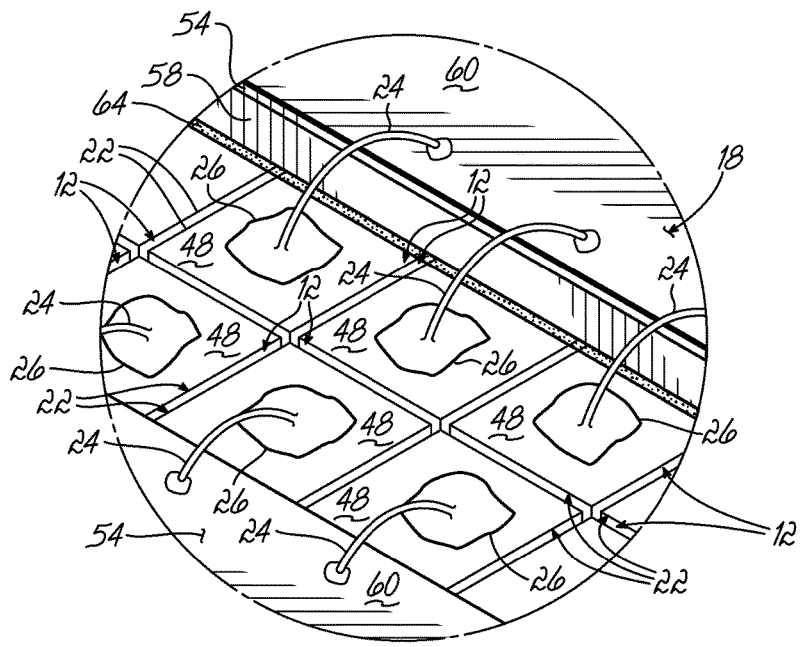
FIG. 3 is an enlarged view of the encircled area 3 in FIG. 1.
Figure 4:
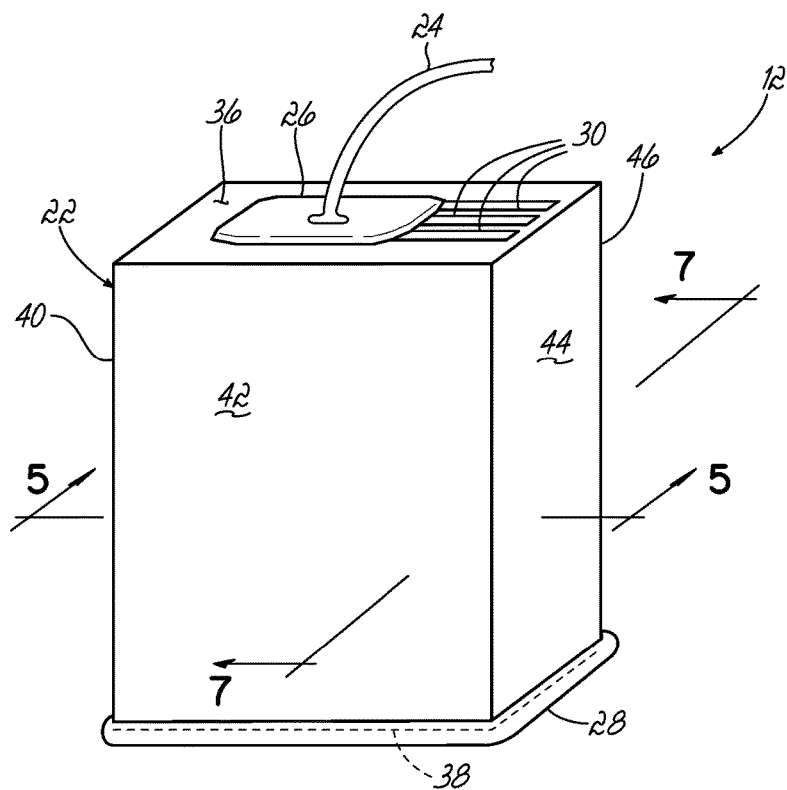
FIG. 4 is a perspective view of a capacitor assembly according to one embodiment of the present invention.

With regard to the exemplary module 10 shown in FIGS. 1, 3, and 4, each capacitor assembly 12 includes a capacitor 22 and a wire bond 24 that electrically connects a top end terminal 26 to the top main conductor 18. A bottom end terminal 28 (shown in FIG. 4) electrically connects the capacitor assembly 12 to the bottom main conductor 20 (shown in FIG. 1). Various embodiments of the capacitor 22 are described below.

Figure 5:
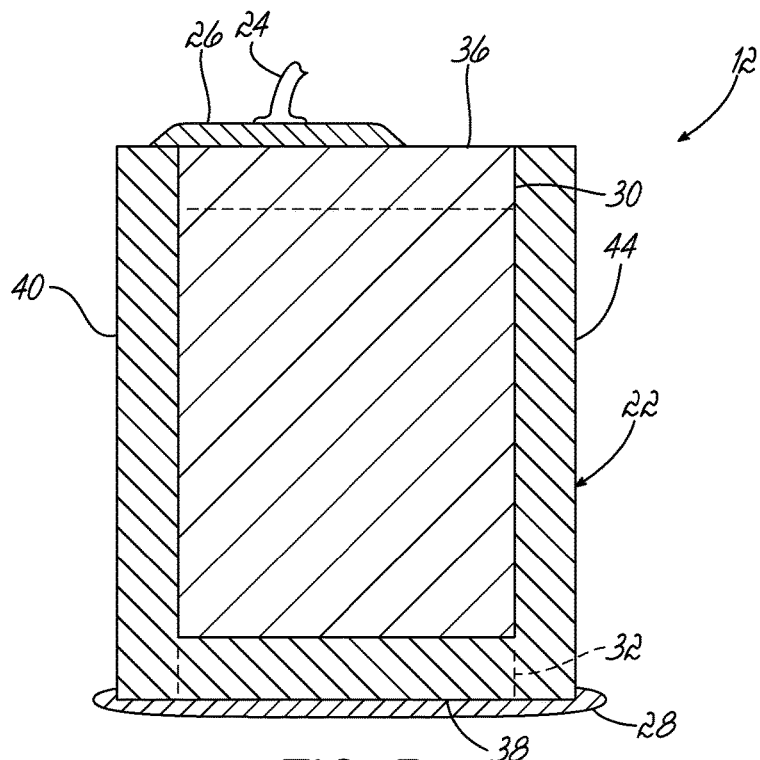
FIG. 5 is a cross-sectional view taken along section line 5-5 of FIG. 4.
Figure 6:
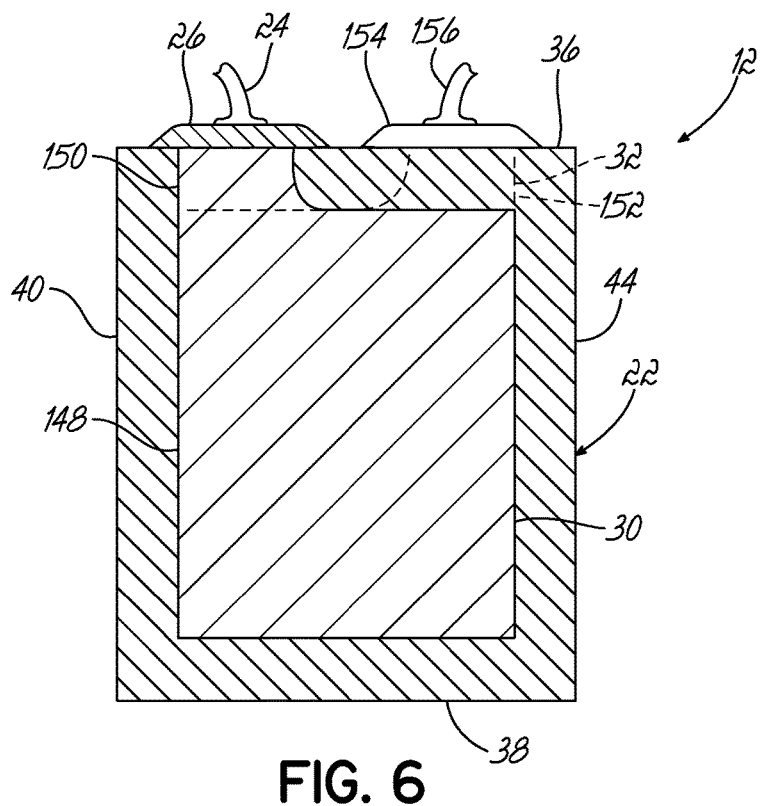
FIG. 6 is a cross-sectional view similar to FIG. 5 of a capacitor assembly according to one embodiment of the present invention.
Figure 7:
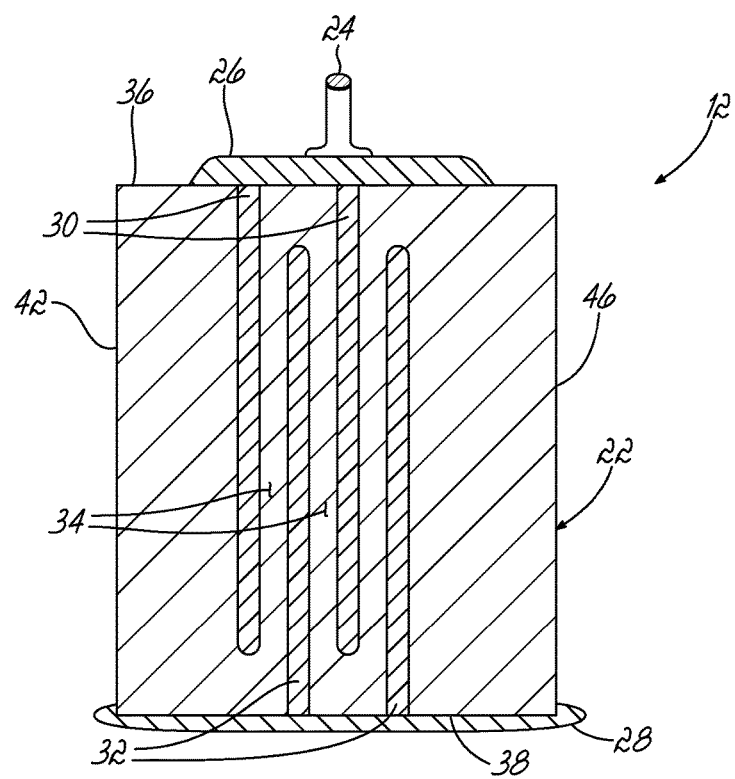
FIG. 7 is a cross-sectional view taken along section line 7-7 of FIG. 4.

With reference to FIGS. 4-7, embodiments of capacitor 22 generally include electrodes 30 that are individually spaced apart from opposing electrodes 32 by dielectric layers 34 (best shown in FIG. 7). Each of the electrodes 30, 32 may be made of metallic materials or other conductive materials that are known in the art. The dielectric layers 34 may be any one of a number of ceramic materials. By way of example and not limitation, the dielectric material may be a titanate ceramic, such as, barium neodymium titanate that is commercially available as type N220A from Dimat, Inc. Cedarburg, Wis. Another exemplary dielectric is majority calcium titanate, N750AA from Dimat, Inc. Both materials give high dielectric constant in a stable Class 1 ceramic (K=80 and K=145, respectively). Also, both materials give high breakdown strength, although the exact breakdown depends on the precise design of the ceramic capacitor, including the layer thickness chosen. It is possible to achieve breakdown strength between 1000V and 2000V on these materials, when used in layer thicknesses of about 0.001 inch. The actual performance depends on numerous process variables during device manufacturing. It will be appreciated that while only four internal electrodes 30, 32 are shown in FIG. 7, the capacitors 22 according to embodiments of the present invention may have hundreds of electrodes 30, 32 separated by dielectric material. Thus, the capacitors 22 may be multilayer capacitors as are known in the art.

With continued reference to the exemplary embodiment shown in FIGS. 4 and 5, the capacitor 22 may have a generally rectangular configuration and thus have ends 36, 38 with sides 40, 42, 44, 46 extending therebetween. It will be appreciated, however, that embodiments of the invention may not have a rectangular configuration as other configurations are possible. The arrangement of the electrodes 30, 32 in the capacitor 22 may vary. For example, the electrodes 30 may extend to and be exposed at the end 36. The electrodes 32 may extend to and be exposed at the other end 38. This arrangement is shown in FIG. 5. Embodiments of the invention are not, however, limited to this configuration. The electrodes 30 may not be exposed along nearly the entire end 36 of the capacitor 22. For example, FIG. 6, described below, depicts such a configuration in which the electrodes 30 are recessed from the end 36 along a portion thereof but are exposed along another portion of the same end 36. The exposure of the electrode 30 shown in FIG. 6 at end 36 being less than half of the exposure of the electrode 30 shown in FIG. 5. The reduction in exposure of the electrode 30 at the end 36 may improve the reliability of the capacitor 22, as is described below.

As is described above and in one aspect of the present invention, the capacitors 22 may be of comparatively small size. That is, the volume enclosed by sides 40, 42, 44, 46 and ends 36, 38 is comparatively small. There are at least two advantages to constructing large arrays of small capacitors. For one, while not being bound by any particular theory, ceramic capacitors of a particular volume size range are believed to provide improved average breakdown strength relative to larger capacitors of similar materials. This is supported by testing data.

Figure 8B:
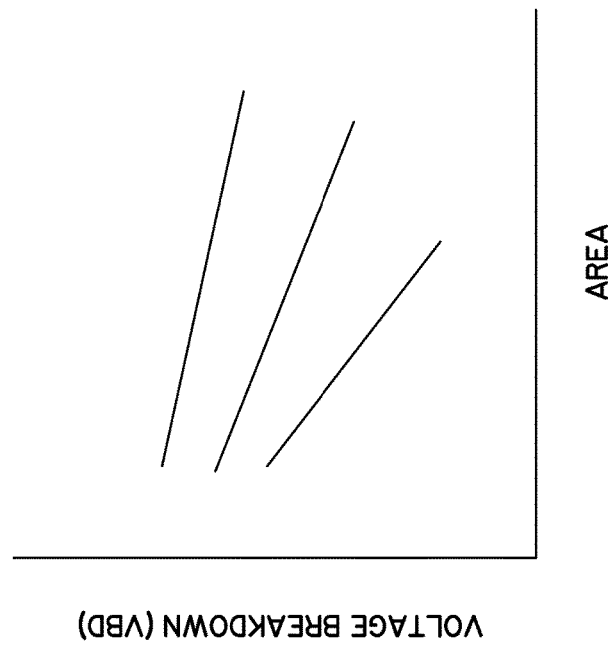
FIG. 8B is a graphical representation of area versus voltage breakdown of a plurality of one type of capacitors.
Figure 8A:
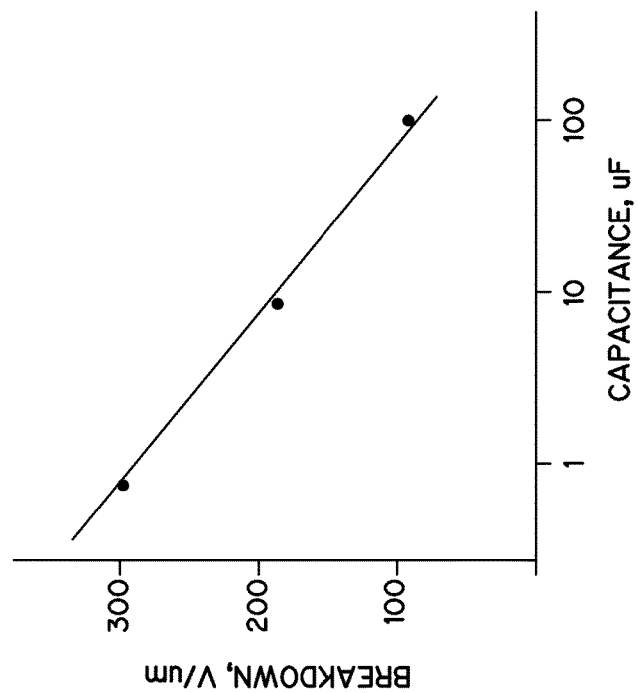
FIG. 8A is a graphical representation of capacitance versus voltage breakdown of a plurality of one type of capacitors.

Data from measurements taken of a ceramic dielectric material is schematically shown in FIGS. 8A and 8B. The ceramic dielectric was a Class 1 titanate material. While the data does not represent all ceramic dielectric materials, FIGS. 8A and 8B illustrate, in a general sense, that average breakdown strength increases as area decreases (other variables, such as, the dielectric thickness, are held constant). Area is a measure of the internal electrode area. The theory is that larger areas have a higher probability of defects. Thus, reducing the area, reduces the probability of defects. As the internal electrode area is reduced, the size of the capacitor may also be reduced. Thus, the data supports the proposition that average breakdown strength may increase as the overall size of the capacitor is reduced. The size of the capacitor also influences the energy storage capacity of the capacitor.

Generally, as the size of the capacitor is reduced, the energy storage capacity of the capacitor is also reduced. However, in view of the testing data, small capacitors may provide higher energy storage per unit volume than comparatively large capacitors by virtue of the relative increase in breakdown strength. Not being bound by theory, it is contemplated that any loss in storage capacity of a capacitor as its size is reduced may be offset by the increase in the average breakdown strength of the capacitor and by forming arrays of small capacitors that are tightly packed together. By way of example only and not limitation, capacitors 22 may range in dimension from about 0.08 inch by 0.05 inch to about 0.22 inch by 0.020 inch. By way of further example, the capacitor process 22 may be about 0.1 inch$^2$ to about 0.5 inch$^2$ The capacitors 22 may touch side-to-side or the sides may be a small gap (e.g., from about 0.0005 inch to about 0.005 inch of space) between adjacent capacitors in the module 10. It will be appreciated that the size range may depend on the various factors associated with the design and manufacture of the capacitors. In particular, the lower size limit of a capacitor may depend on the relative size of the internal electrodes and the total volume of the capacitor. It is known that the internal electrodes that are the active portion of the capacitor are smaller in dimension than the overall size of the capacitor to allow for a margin of dielectric to surround the electrode on at least three sides. In this case, as size is reduced, at some size, the active portion becomes the smaller proportion of the total volume of the capacitor so that the energy storage capability of the capacitor is diminished at a higher rate than the rate at which the average breakdown strength increases. Capacitor sizes smaller than this size may actually reduce energy density despite an increase in average breakdown strength and tightly packing those capacitors together. While not being limited to any particular size range, according to embodiments of the invention, the capacitors 22 within the size range set out above may provide high breakdown strength while maximizing energy density when arranged in tightly packed arrays. Smaller or larger sizes may be useful depending on the total amount of energy desired for certain applications.

Another advantage to constructing arrays of small capacitors 22 arranged in close proximity to one another is that the interface between adjacent capacitors 22 resists fracture propagation across multiple capacitors. Even if the sides of two capacitors touch, a fracture in one capacitor is unlikely to propagate across the interface to an adjacent capacitor. For instance, when a capacitor experiences dielectric break down, the associated energy surge may cause the capacitor to fracture. According to embodiments of the invention, the interface between adjacent capacitors is a barrier to fracture propagation and so prevents a fracture in one failed capacitor from propagating into one or more adjacent operational capacitors thereby improving the overall reliability of the module 10.

According to embodiments of the present invention, capacitors 22, for example, having 0.1 inch$^2$ may have a voltage breakdown strength average near 300 volts per micron (V/µm), whereas larger capacitors (e.g., approximately 100 times larger) made from the same material may have an average breakdown strength near 100 V/µm. In other words, the capacitors 22 according to embodiments of the present invention may have approximately three times the average breakdown strength of capacitors one hundred times their size. A collection of capacitors 22, when grouped together in a side-to-side arrangement in an array or in close proximity to one another, described above, may store significantly more energy on a more reliable basis than a single, relatively large capacitor of about the same volume.

Figure 9:
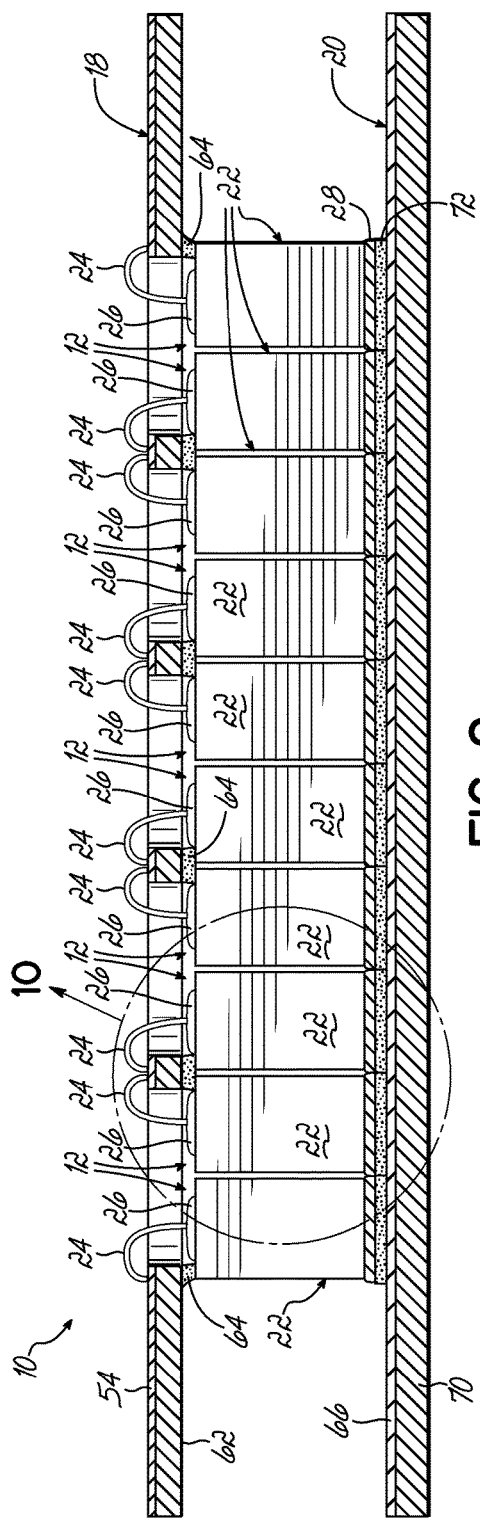
FIG. 9 is a side elevation view of the module shown in FIG. 1.
Figure 10:
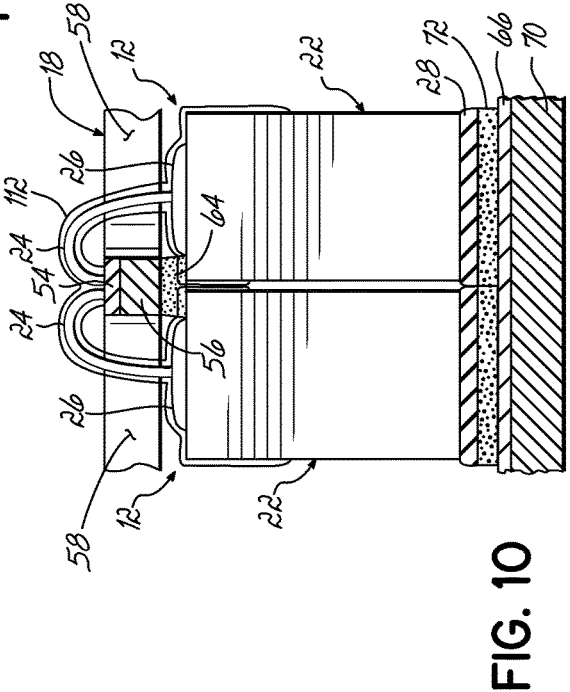
FIG. 10 is an enlarged view of the encircled area 10 of FIG. 9.

With reference now to FIGS. 9, 10, and 11, in further regard to the reliability of the energy storage module 10, the capacitor assembly 12 is configured to form an open circuit should the capacitor 22 fail closed. To that end, the wire bond 24 is intended to function as a fuse between the top main conductor 18 and the capacitor 22 if the current through the wire bond 24 exceeds a fusing current. Not being bound by theory, at or above the fusing current failure may be determined by heat buildup in the wire bond 24. Generally, a maximum temperature may occur in the center region of the wire bond 24 and is the region at which melting and therefore failure of the wire bond occurs. The fusing current may be considered during the design and assembly of the device and may include consideration of the current carrying capacity of the wire for a predetermined time. For example, the fusing current may be designed to be at a fixed number of amps for a fixed time. At currents and times at or above the designed level, the wire bond fuses or fails. According to embodiments of the present invention, the modular wire bonded capacitor configuration may prevent catastrophic failure of the module should any single one of the individual capacitors fail catastrophically.

Further in this regard, it is known that capacitors may fail during use. If any single one of the capacitors 22 fails, it may fail closed. To prevent unconstrained current flow through the electrical circuit in the event of a capacitor failing closed, the wire bond 24 is designed to fail by, for example, melting, exploding, or otherwise destructing, so as to open the circuit between the top main conductor 18 and the bottom main conductor 20. In this way, the energy storage module 10 as a whole may not suffer a catastrophic failure or any devices electrically connected to the energy storage module 10 may not be damaged due to failure of any single one of the capacitors 22. The failure of a capacitor may therefore be compartmentalized to that capacitor and the module 10 may still then continue to function.

With continued reference to FIGS. 9, 10, and 11, the wire bond 24 may be joined directly to the end terminal 26 at one end of the wire bond 24. In one embodiment, the wire bond 24 is welded to the end terminal 26 via a wire bonding process that includes a combination of heat, pressure, and ultrasonic energy to weld the wire bond 24 to the end terminal 26. The other end of the wire bond 24 may then be joined in a similar manner directly to the top main conductor 18, described below, so as to electrically connect the electrodes 30 to the top main conductor 18. Wire bonding may include forming a ball-shaped joint at one end and a wedge-shaped joint at the other end of the wire bond 24. The wire bond 24 may be joined at the main conductor 18 via a ball joint at one end with the other end being joined at the end terminal 26 via a wedge joint. The reverse configuration is also possible, that is, wedge joint formation between the wire bond 24 at the main conductor 18 and ball joint formation between the wire bond 24 and the end terminal 26 is possible. Wire bonds do not include thin films of metal as a layer on a printed circuit board or thin films that reside in a single layer formed on a surface such as are found in integrated circuits.

During joint formation, a loop height of the wire bond 24 above the main conductor 18 may be adjusted to reduce the overall volume of the module 10 and thus improve energy density or the loop height may project beyond the main conductor 18, as shown. In either configuration, the wire bond 24 may be free-floating between its two ends. That is, free space may surround the wire bond 24 from one end to the other end. Each end being attached as described herein. The wire bond 24 may not be disposed in solder or another conductive material. Though, as described below, the wire bond 24 may be encased in a non-conductive material subsequent to the bonding process.

According to embodiments of the present invention, the wire bond 24 may be made of gold or made of an alloy including gold similar to the end terminal 26 described below. While gold and gold alloys are specifically described, it will be appreciated that other conductive metals may be utilized according to embodiments of the present invention. That is, embodiments of the present invention are not limited to gold. In particular, other exemplary metals include aluminum, silver, or copper or alloys of these metals. Other alloys having similar resistivity and/or a melting point may alternatively be utilized.

The wire bond 24 is sized to carry the electrical current to and/or from the respective capacitor 22 during charging or discharging of the capacitor 22, respectively. To that end, by way of example only and not limitation, the wire bond 24 may be a wire having a uniform circular cross section with a diameter in the range of about 20 µm to about 50 µm, and, by way of further example, in the range of about 20 µm to about 30 µm. The wire bond 24 may have other configurations. For example, the wire bond 24 may have a rectangular cross-section so as to appear ribbon-like. Further, the wire bond 24 may include a region at which it is intentionally designed to fail. Including such a feature may allow a controlled release of energy so that should the wire bond explode, the location of that explosion does not negatively impact one or more adjacent capacitor assemblies 12.

In that regard, the wire bond 24 may include a region of high resistance. This region is configured to be the most likely portion of the wire bond 24 to fail during a high current event. Regions of high resistance may be produced by joining at least two different metallic compositions. For example, the wire bond may include a gold wire that is joined to a palladium-silver end terminal, and by way of additional example, the wire bond 24 may include an aluminum wire that is terminated on a gold end terminal. It will be appreciated that the location where the dissimilar metals meet will have a higher resistivity than the metals themselves. This location would then be more likely to fail. Another configuration may include a wire bond that is manipulated to have a region of a narrower cross-section than the remainder of the wire. And, another configuration may include a region of increased strain to create a location of high resistance along the length of the wire bond. Each of these locations may then be the weakest link in the wire bond and be the location most likely to fail during a high current event, such as during dielectric breakdown of an adjacent capacitor.

With reference once again to FIGS. 4 and 5, the end terminal 26 is electrically coupled to each of the electrodes 30 at end 36 by methods known in the art. In one embodiment, the end terminal 26 may be made from gold (Au) or an alloy of gold, including, for example, gold alloys containing silver (Ag), copper (Cu), nickel (Ni), manganese (Mn), and/or palladium (Pd). As is known, these gold alloys may be of various standard purities, referred to as 18 karat (K), 14 K, and 9 K. Embodiments of the present invention may specifically exclude end terminals and wire bonds made of solder materials, such as, tin-silver (Sn/Ag) solder, and are not compatible with solder reflow processes.

In one embodiment and with reference now to FIGS. 3 and 4, and with regard to improved reliability, when the capacitors 22 are arranged in an array in which the capacitors 22 touch side-to-side or are spaced apart (e.g., less than or equal to about 0.003 inch gap between capacitors), the end terminal 26 may cover less than the total surface of the end 36 of the capacitor 22 so as to leave a margin 48 of nonconductive material of the capacitor 22 around the end terminal 26. In the exemplary embodiment, the end terminal 26 does not wrap around to any of the sides 40, 42, 44, 46.

The margin 48 may therefore separate the end terminal 26 from the sides 40, 42, 44, 46. While the margin 48 may be generally uniformly distributed between the sides 40, 42, 44, 46 and the end terminal 26, embodiments of the present invention are not limited to uniform margins 48. By way of example only, the margin 48 may be enlarged on one side where the end terminal 26 is offset from the center line of the capacitor 22, as is described below. The margin 48 may improve the reliability of the capacitor assembly 12 when assembled in the module 10.

Specifically, in a closely packed array of capacitors 22, as shown in FIG. 3, the margin 48 reduces the likelihood that adjacent capacitors 22 short across adjacent end terminals 26. This may be particularly apparent when one wire bond fails and a residual portion of the wire bond droops over an adjacent capacitor assembly 12. The margin 48 reduces the likelihood that that residual wire bond portion contacts the end terminal 26. In other words, the margins 48 of each capacitor assembly 12 inhibit or significantly reduce the possibility that adjacent capacitors 22 short across their respective end terminals 26, particularly in the event of a failure. The end terminal 28 may differ in both material and in configuration from the end terminal 26.

With reference to FIGS. 4 and 5, the bottom end terminal 28 is electrically connected to each of the electrodes 32 at end 30 by methods known in the art. The end terminal 28 may then electrically connect the electrodes 32 to the bottom main conductor 20, shown in FIG. 1 and described below. The end terminal 28 may be made of a different metallic conductor from the end terminal 26, that is, the end terminal 28 may be other than gold or a gold-containing alloy, as is described above with regard to the end terminal 26. In particular, the end terminal 28 may be a silver-containing material, for example, a palladium-silver (Pd—Ag) mixture, or a copper (Cu) or copper-containing alloy. By way of additional example, solder materials, such as, lead-free solders, may be used.

With reference now to FIGS. 9 and 10, in one embodiment the capacitor assemblies 12 are electrically connected to the top main conductor 18 and the bottom main conductor 20. Each of the top main conductor 18 and the bottom main conductor 20 may be in the form of a conductive plate to which opposing end terminals 26, 28 are electrically connected, respectively. In one embodiment, the top main conductor 18 may include a metal layer 54 supported by a non-conductive substrate 56, which by way of example only, and not limitation, may be a circuit board, a flexible circuit, or similar material, to name a few.

In one embodiment, the top main conductor 18 may include a channel 58 (shown in FIGS. 1 and 2) extending through the thickness from one side 60 to the opposing side 62 of the main conductor 18. The wire bond 24 from each capacitor assembly 12 may pass through the channel 58 and be joined to the side 60, particularly to the metal layer 54 of the top main conductor 18. The capacitor assembly 12 may further be secured to the top main conductor 18.

In particular, and with reference to FIG. 10, in one embodiment an adhesive layer 64, such as, a layer of an epoxy, may bond the capacitor 22 to the top main conductor 18, as well as, separate each capacitor 22 from the top main conductor 18. In one embodiment, the layer 64 of the adhesive is a layer of conductive epoxy that may, for instance, contain silver and be available commercially from Henkel as 84-1 LMIT1. In addition to connecting the main conductor 18 to the capacitor 22, the adhesive layer 64 may stabilize or otherwise provide rigidity to the conductor 18 so that stable wire bonding can be made with the wire bond 24. From a reliability standpoint, the adhesive layer 64 may prevent debris from a wire bond failure from penetrating between the capacitor 22 and the main conductor 18. In embodiments in which the top main conductor 18 is a solid plate of metal, the adhesive layer 64 is non-conductive. A similar configuration for securing the capacitor 22 to the top main conductor 18 may be utilized between the capacitor 22 and the bottom main conductor 20.

In one embodiment, and with continued reference to FIG. 10, the bottom main conductor 20 may also include a metal layer 66 on a non-conductive substrate 70. An adhesive layer 72 may bond the capacitor 22 to the bottom main conductor 20. The adhesive layer 72 may be conductive and may electrically connect the metal layer 66 through the end terminal 28 to the electrodes 32. It will be appreciated that other configurations of the bottom main conductor 20 are also possible including, for example, the bottom main conductor 20 being a solid metallic plate. However, in embodiments in which the bottom main conductor 20 is a solid plate, the module 10 may further include a layer of non-conductive material (not shown) on the opposite side of the main conductor 20 from the capacitors 22.

While other electrical arrangements are possible and are described below, the capacitor assemblies 12 are electrically connected in parallel to one another in the energy storage module 10 shown in FIG. 1. This parallel electrical configuration is schematically shown in FIG. 11 in which the result of a failure of a capacitor 22 and the capability of the wire bond 24 is best illustrated. The electrical circuit 76 depicts multiple capacitor assemblies 12 in the energy storage module 10. Specifically, multiple capacitor assemblies 12 may be electrically connected in parallel between the top main conductor 18 and the bottom main conductor 20 to form the energy storage module 10. During use of the energy storage module 10, a capacitor that short-circuits (shown schematically at 78) causes the associated wire bond to destruct (shown schematically at 80) so as to segregate the short-circuited capacitor from the circuit.

With reference to FIGS. 9 and 11, in addition to providing a point of electrical contact for each of the capacitor assemblies 12 and improving the rigidity of the energy storage module 10, the top main conductor 18 may further reduce the possibility of short circuiting adjacent capacitors in the module 10 when one wire bond 24 blows. If a wire bond fails, as is schematically shown in FIG. 11, the main conductor 18 may shield adjacent capacitor assemblies 12 from metallic debris from that failure and direct the energy released during that failure away from the adjacent capacitor assemblies 12.

To that end, as described above, the top main conductor 18 may include a channel 58 through which each of the wire bonds 24 passes. The main conductor 18 may minimize exposure of large portions of the capacitor assemblies 12 to debris from a failed wire bond. Directing the released energy away from adjacent capacitor assemblies 12 may also direct metallic debris from the failed wire bond away from adjacent capacitor assemblies 12. The metallic debris may therefore be less likely to contact end terminals 26 and wire bonds 24 on adjacent capacitor assemblies 12 and so will be less likely to short circuit other assemblies 12 in the energy storage module 10.

Further in that regard, in one embodiment and with reference to FIG. 12, the top main conductor 18 may include a plurality of openings 80 that extend from one side 60 to the other side 62 of the top main conductor 18. In the exemplary embodiment shown, the openings 80 are in the form of circular, through holes. The circular, through holes may be formed by drilling through the top main conductor 18. The openings 80 may be centered on an axis 82. The end terminals 26 of each of the capacitor assemblies 12 may be centered on an axis 86. The axis 82 and the axis 86 may be substantially parallel to one another such that the end terminals 26 align with the openings 80. Each wire bond 24 from the individual capacitor assemblies 12 may pass through a respective opening 80 to be bonded to the main conductor 18. In the embodiment shown, the through holes are approximately the same size or slightly smaller than the area of the end terminals 26. It will be appreciated that the size of the openings may be dictated by the ease with which the wire bonds 24 may be passed through the respective opening 80 to be bonded to the top main conductor 18. As the size of the openings 80 decreases, assembling the energy storage module 10 may be more difficult. Openings having other cross sectional configurations are possible. For example, rectangular, oval, square, or cone-like openings are possible.

Depending on the size of the openings, the main conductor 18 may further shield the capacitor assemblies 12 from metallic debris that is likely to be generated during wire bond failure when compared to the channel 58, shown in FIG. 1, for example. In particular, the openings 80 may also contain the metallic debris associated with failure of a corresponding wire bond and/or direct any debris associated with a wire bond failure upwards in a volcano-like fashion away from adjacent capacitor assemblies 12.

In an alternative embodiment and with reference to FIG. 13, the top main conductor 18 may include a plurality of openings 90. As shown, the openings 90 may be similar to the openings 80. In the exemplary embodiment shown, the openings 90 may be through holes but may be staggered diagonally from one another so as to be positioned along two separate axes, for example, an axis 92 and an axis 94. Each of the axes 92, 94 may generally align with an axis 100 and an axis 102 defined by the end terminals 26 of the capacitor assemblies 12.

As shown, the end terminals 26 on immediately adjacent capacitor assemblies 12 are also staggered. In the embodiment shown, the end terminals 26 aligned on axis 100 are off center on the ends 36 of the respective capacitors 22 at approximately 25% of the width dimension of the end 36 from side 40. In other words, the end terminals 26 may be offset from a center line of the capacitor 22 about one-half the distance toward side 40 from the center line (labeled 50% in FIG. 13).

The adjacent capacitor assemblies 12 may have a similar offset but in the opposite direction. In particular, the end terminals 26 aligned on axis 102 may be offset on the ends 36 from the center line of each capacitor 22 about one-half the distance toward the side 46 (labeled 75% in FIG. 13). This configuration increases the distance between adjacent terminals 26 and associated openings 90 and may further reduce the possibility that debris from a wire bond failure may reach the end terminal 26 adjacent the wire bond failure while the tightly packed array of capacitor assemblies is maintained.

Figure 14:
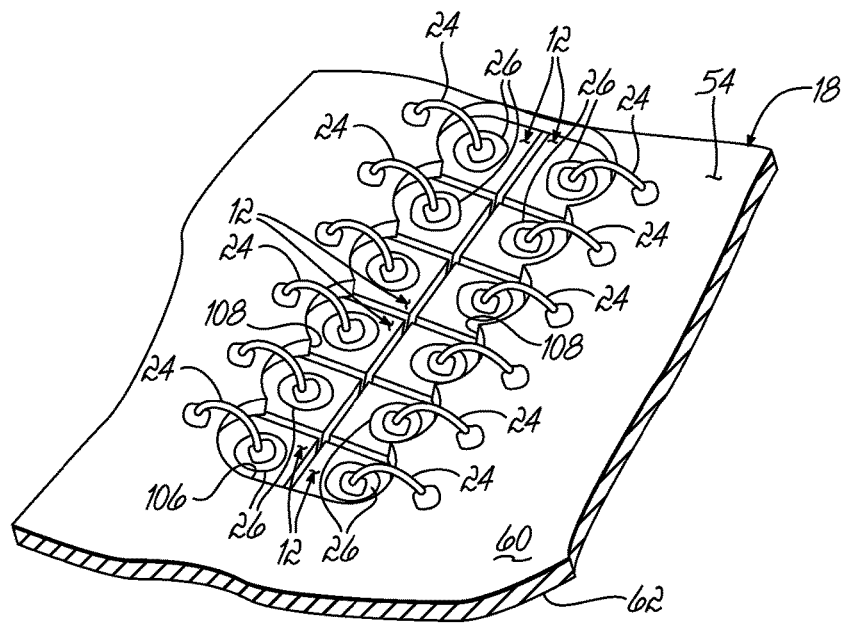
FIG. 14 is a perspective view of one embodiment of the invention.

In yet another embodiment, and with reference to FIG. 14, the top conductor 18 may include a channel-like opening 106 that extends through the conductor 18 from one side 60 to the opposing side 62. The opening 106 differs from the channel 58 in that the channel-like opening 106 may include partial walls 108 that extend partway between adjacent capacitor assemblies 12. Specifically, the partial walls 108 may extend partway between adjacent wire bonds 24 and corresponding end terminals 26. Similar to the circular, through holes described above, the partial walls 108 may deflect debris generated by a wire bond failure away from adjacent capacitor assemblies 12. In this way, the channel-like opening 106 may reduce the likelihood that metallic debris causes adjacent capacitor assemblies 12 to short out.

Figure 15:
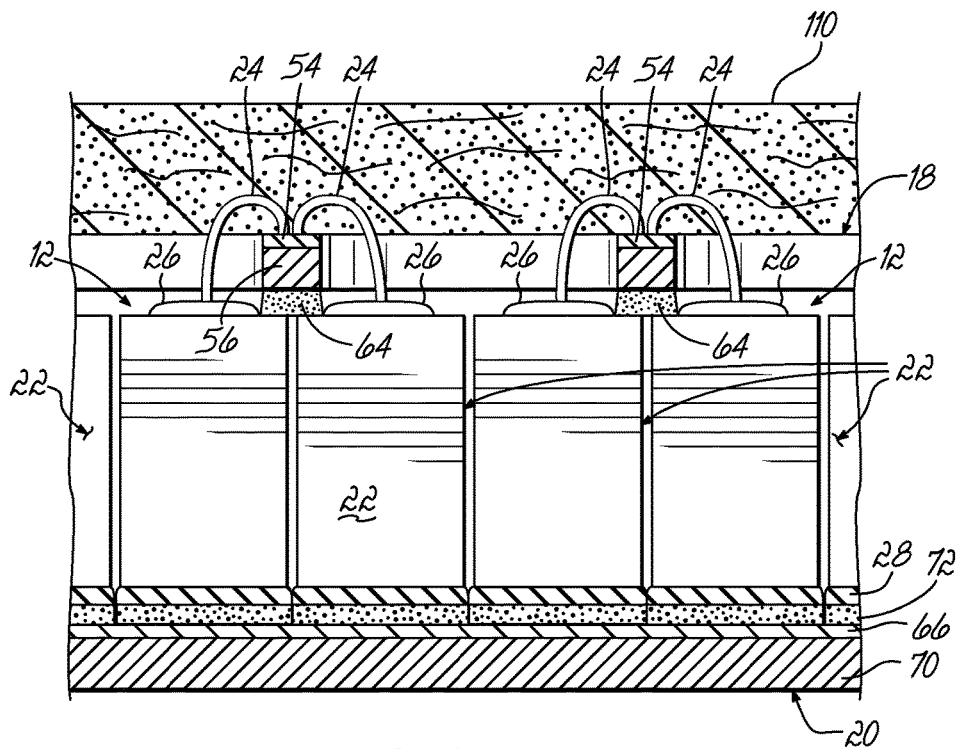
FIG. 15 is a side elevation view of a module according to one embodiment of the invention.
Figure 16:
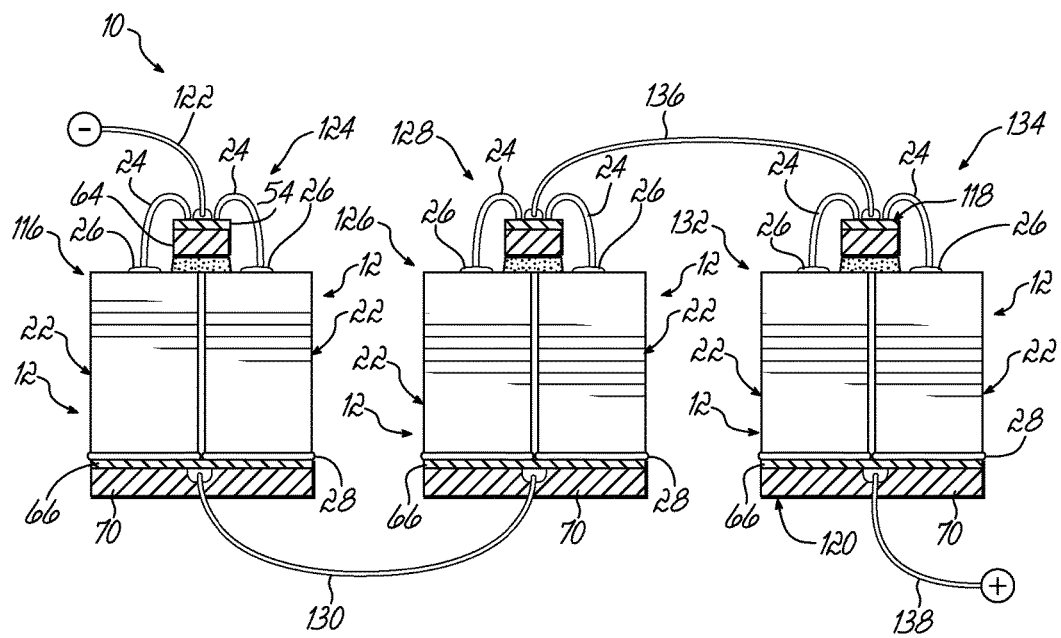
FIG. 16 is a side elevation view of a module including pairs of capacitor assemblies electrically connected in series according to one embodiment of the invention.

Embodiments of the present invention include other features that are configured to contain or deflect debris from a wire bond failure. In particular, and with reference now to FIG. 15, in one embodiment, a layer of a porous, non-conductive material 110 may be placed on the top main conductor 18 so as to contact and possibly envelop each of the wire bonds 24. In this regard, the layer of non-conductive material 110 may be relatively soft in the sense that the fibers may be easily compressed or movable so as not to mechanically stress the wire bonds 24. The non-conductive material 110 may improve the reliability of the energy storage module 10.

Specifically, the non-conductive material 110 may capture any metallic or other debris released during the activation (i.e., failure) of a wire bond. This may prevent the spread of small pieces of conductive material across the module 10. Furthermore, the non-conductive material 110 may absorb any energy released during activation of a wire bond and thus may dampen the shock associated with the energy released during that event. By way of example only, and not limitation, the layer of porous, non-conductive material 110 may be a layer of ceramic fibers, such as, aluminum oxide fibers, aluminosilicate fibers, glass fibers, and/or zirconium oxide fibers, to name only a few. Other particulate materials may be used including, for example, silica sand and/or alumina sand. It will be appreciated that other non-conductive materials may be utilized. By way of further example, the layer of non-conductive material 110 may be approximately 0.050 inch thick, though embodiments of the present invention are not limited to any particular thickness of the layer of non-conductive material 110.

The module 10 may include other materials in addition to or as an alternative to that described above. For example, and with reference to FIG. 10, a non-conductive coating 112 may be deposited on the module 10. The non-conductive coating 112 may coat the wire bonds 24 and a portion of the capacitors 22, as shown. The coating 112 may absorb energy and at least partially contain debris during an explosion of the wire bond 24. The coating 112 may also prevent debris from coming into direct contact with adjacent end terminals 26 and so prevent collateral damage to surrounding capacitor assemblies 12. By way of example, and not limitation, the coating 112 may be an organic polymer coating, such as, an epoxy, an acrylic, or paralene (also known as Parylene) (unsubstituted poly(para-xylylene), e.g., Parylene N, and substituted poly(para-xylylene), e.g., Parylene C and Parylene D), and polytetrafluoroethylene (PTFE), to name a few. As another non-limiting example, silicone rubber may be used to form the coating 112 or even the layer 110, described above. Uncured silicone material may be poured or coated onto the assemblies 12, for example, the tops of the wire bond loops may be coated. Once cured, the silicone rubber provides similar protections as those provided above. That is, the silicone rubber may be similar to a potting component as it may prevent electrical arcing and keep debris off of adjacent capacitor assemblies.

Embodiments of the present invention are not limited to parallel connectivity between the capacitor assemblies 12 as is generally shown in FIGS. 1-3, 9, and 11. With that and with reference now to FIGS. 16-20, combinations of parallel and series connections and series-only connections are also contemplated.

In general, for example, multiple groups of capacitor assemblies 12 may be connected in parallel within a particular group. Those groups may then be connected in series with respect to one another to form a module. For instance, and with reference to FIG. 16, in which like reference numerals refer to like features in FIGS. 1-5, three pairs of capacitor assemblies 12 may be connected in series. That is, six capacitor assemblies 12 are arranged so that they make three groups of two capacitor assemblies 12 in series with each other.

Specifically, a first pair 116 of capacitor assemblies 12 may be electrically connected in parallel. That is, the capacitor assemblies 12 of the first pair 116 may share a top main conductor 118 constructed similar to top main conductor 18 (described above) and may share a bottom main conductor 120 constructed similar to the bottom main conductor 20 (described above). The first pair 116 essentially forms an energy storage module 124, which may be connected to other modules in series. For example, the first pair 116 of capacitor assemblies 12 may receive a solder wire or circuit board connection 122.

A second pair 126 of capacitor assemblies 12 constructed in a similar manner as the first pair 116 and forming a second energy storage module 128 may be coupled to the first pair 116 by a solder wire or other connection 130 so that the first pair 116 (i.e., the first module 124) and the second pair 126 (i.e., the second module 128) are connected in series.

In the embodiment shown, a third pair 132 of capacitor assemblies 12 constructed similarly to the first pair 116 and the second pair 126 to thereby form a third module 134 is coupled to the second pair 126 via a connection 136 thereby connecting the third module 134 in series with the first module 124 and the second module 128.

Figure 17:
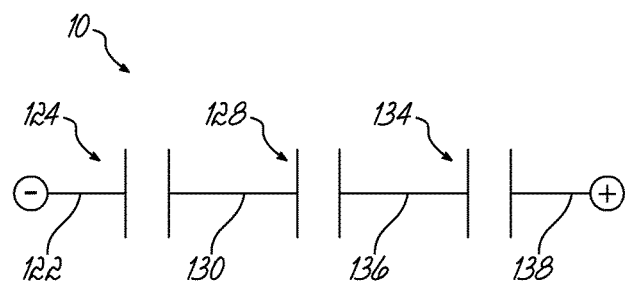
FIG. 17 is a schematic representation of the module shown in FIG. 16.

Each of the modules 124, 128, 134 may collectively form the energy storage module 10. Another connection 138 may electrically connect the energy storage module 10 to an electrical circuit. While pairs of capacitor assemblies 12 are shown, it will be appreciated that the top and bottom main conductors 118 and 120 may be elongated so as to receive many more pairs of capacitor assemblies 12. By way of example, one or more of the modules 124, 128, 134 may include a hundred or more capacitor assemblies 12 in pairs. With 100 capacitor assemblies, if the capacitors 22 are rated to 1,000 V each then the embodiment shown in FIG. 16 and schematically illustrated in FIG. 17 is a 3,000 V module.

Figure 18:
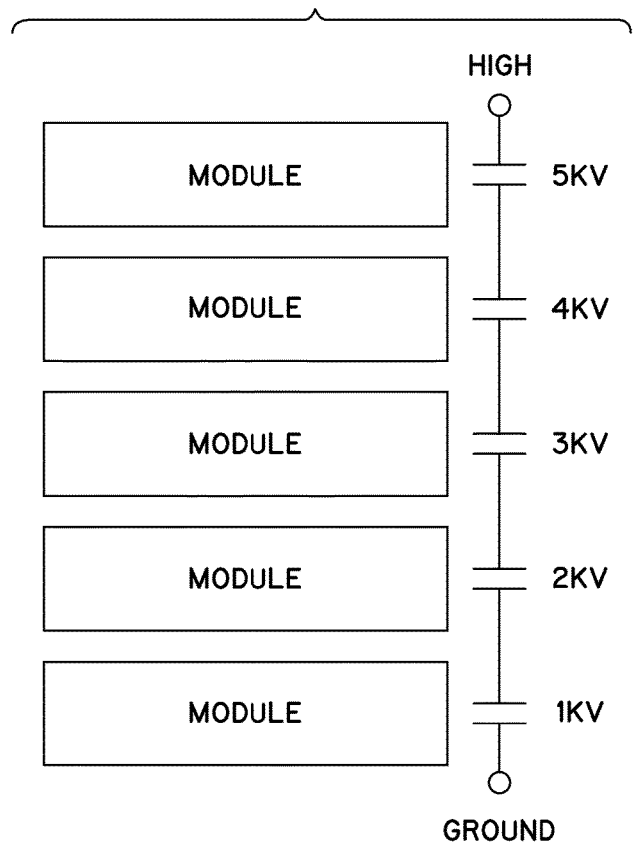
FIG. 18 is a schematic representation of a module according to one embodiment of the invention.

By way of additional example and with reference to FIG. 18, modules constructed of groups of 400 capacitor assemblies 12 may be put into series with other modules constructed of 400 capacitor assemblies 12. If five of these 400-capacitor modules are connected in series, there would be a total of 2,000 capacitors. If each capacitor has a voltage rating of 1,000 V then the energy storage assembly would be capable of storing 5,000 V of energy.

In another embodiment of the invention, modules may be constructed without the use of either of the main conductors 18 and 20. With reference now to FIG. 6, each of the electrodes 30, 32 may extend to and be exposed at a single end, such as, at end 36 of the capacitor 22. As shown, the electrode 30 may have a generally rectangular portion 148 which is encased in dielectric material so as to form a margin around nearly the entire portion of the rectangular portion 148. An extension or tab 150 is offset (e.g., to the left) from a center line of the capacitor 22, extends from the rectangular portion 148, and is exposed at the end 36 of the capacitor 22. The electrode 32 has a similar configuration but has a tab 152 that is offset from the center line in the opposite direction (e.g., to the right in the figure). The tab 152 also extends to the end 36. Accordingly, neither of the electrodes 30, 32 may extend to or be exposed at the end 38.

Because the electrode 32 extends to the end 36, a second end terminal 154 is formed on the same end 36 as the end terminal 26. The end terminal 154 is spaced apart from the end terminal 26 on the end 36 and is in electrical communication with the electrodes 32. The second end terminal 154 may be substantially similar both in material and in size to the end terminal 26, as is described above.

The wire bond 24 may electrically connect to the end terminal 26 as described above. A second wire bond 156 may electrically connect the second end terminal 154, and hence the electrodes 32 to an electrical circuit. The second wire bond 156 may be substantially similar to the wire bond 24 both in dimension and in size as is described above.

Figure 19:
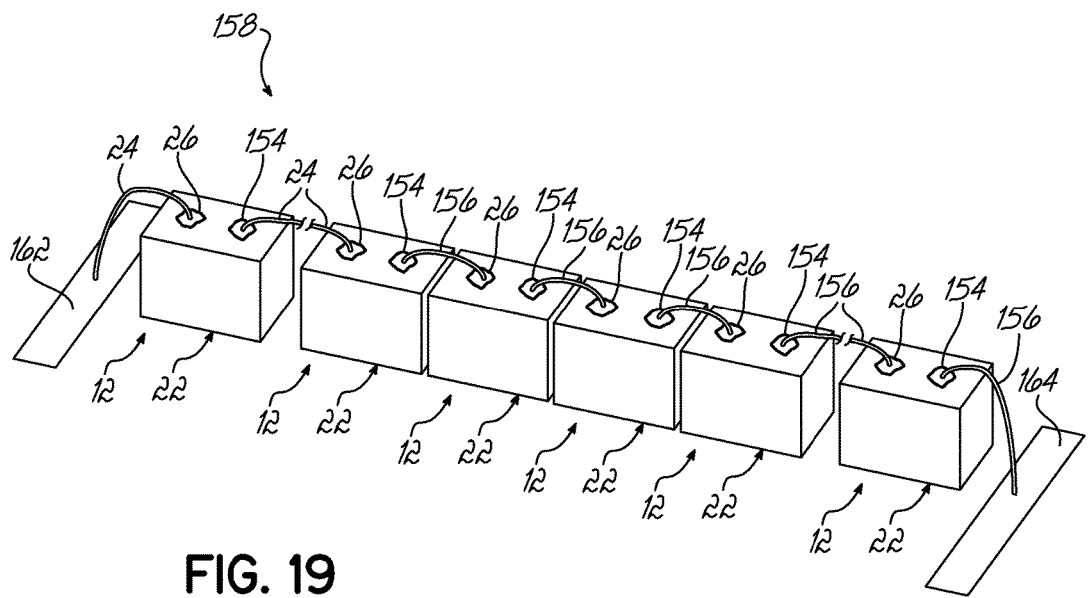
FIG. 19 is a perspective view of a module according to one embodiment of the invention with the capacitor assemblies electrically connected in series.

In one embodiment, the capacitor assembly 12 shown in FIG. 6 may be connected in series with additional capacitor assemblies 12 to form a module 158 in the form of a string of capacitor assemblies 12. As is shown in FIG. 19, the string 158 may therefore be formed by connecting the capacitor assemblies 12 in series. Wire bonds 156 may electrically connect end terminals 154 on one capacitor assembly 12 with the adjacent end terminal 26 on an adjacent capacitor assembly 12. In this regard, main conductors, such as those shown in FIG. 1, may not be required where a series connection between each capacitor is constructed. The string module 158 may be soldered at either end to main conductors 162 and 164. In addition, a substrate (not shown) may be used to support the capacitor assemblies 12 and hold them in fixed position relative to one another.

Figure 20:
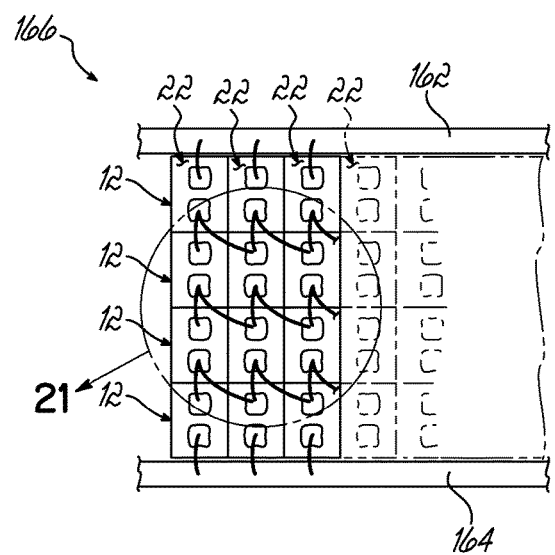
FIG. 20 is a plan view of a module according to one embodiment of the invention.
Figure 21:
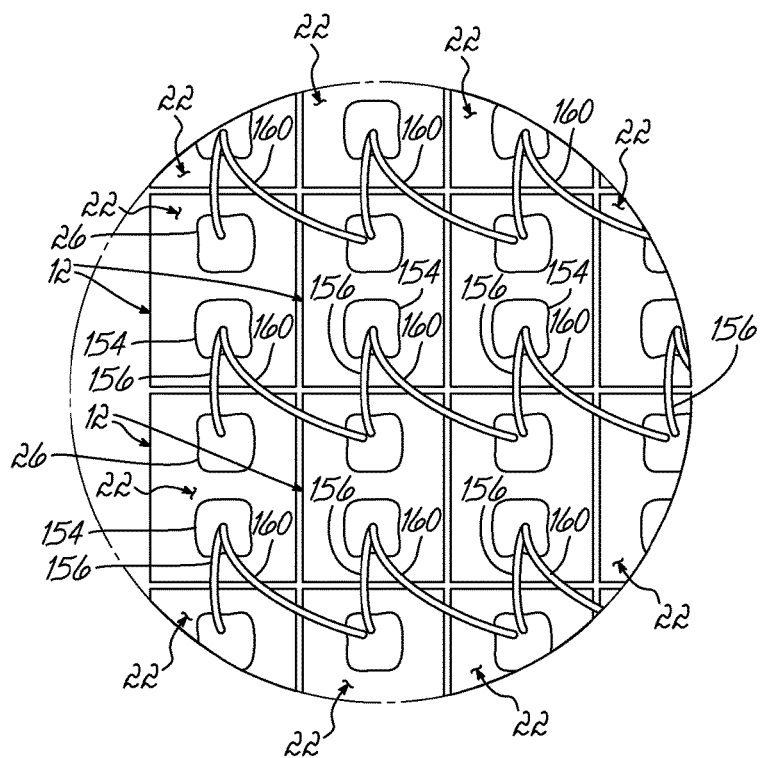
FIG. 21 is an enlarged view of the encircled area 21 in FIG. 20.

By way of further example with regard to series connections, each of the capacitor assemblies 12 of FIG. 6 may be connected in series with other capacitor assemblies 12 to form a module 166 having a panel configuration shown, for example, in FIGS. 20 and 21. In this regard, the module 166 may include multiple capacitor assemblies 12 with many of those assemblies 12 including a wire bond 160 that extends from the second end terminal 154 in a diagonal direction to a diagonally adjacent capacitor assembly 12. These diagonal connections are shown best in FIG. 21.

Many of the capacitor assemblies 12 in the arrangement shown in FIG. 21 are therefore connected to at least three other capacitor assemblies 12. If one of the capacitors 22 breaks down so as to cause a corresponding wire bond 24, 156, or 160 to destruct, this destruction may occur without losing access to the energy stored by the remaining, functional capacitors 22 in proximity to the failed capacitor. The remaining network of wire bonds in the panel 166 may allow transmission of energy around the destructed wire bond. It will be appreciated that the wire bond 160 may be the same or different from each of the wire bonds 24 and 156. However, because of this series arrangement, the second and third wire bonds 156, 160 may be sized to carry the current for all capacitors 22 electrically connected to the respective capacitor. With reference to FIG. 20, main conductors 162 and 164 may electrically connect the capacitor assemblies 12 to an electrical circuit (not shown).

Any of the above-identified modules may be used alone or in combination, either in parallel or in series, to construct an energy storage assembly. In one embodiment and with reference to FIG. 22, a module 180 representing any of the above-described modules may be stacked one on top of the other and may be electrically connected in series or in parallel, as described above, to construct an energy storage assembly 200. In view of the above, the energy storage assembly 200 may have a storage capacity that is measurable in terms of joules of energy. For example, if one module operates at 1,000 V, then ten modules 180 stacked together would operate at 10,000 V. Very high voltages may be achievable with this construction, such as, up to 100,000 V or even higher. For example, each module 180 may store 4 J, so that a stack of 10 modules 180 will contain about 40 J and may operate at 10,000 V. By way of further example each module 180 may store 10 J. The assembly 200 may then store 100 J of energy at 10,000 V. With additional modules 180, a total energy of 1,000 J is achievable.

Figure 22:
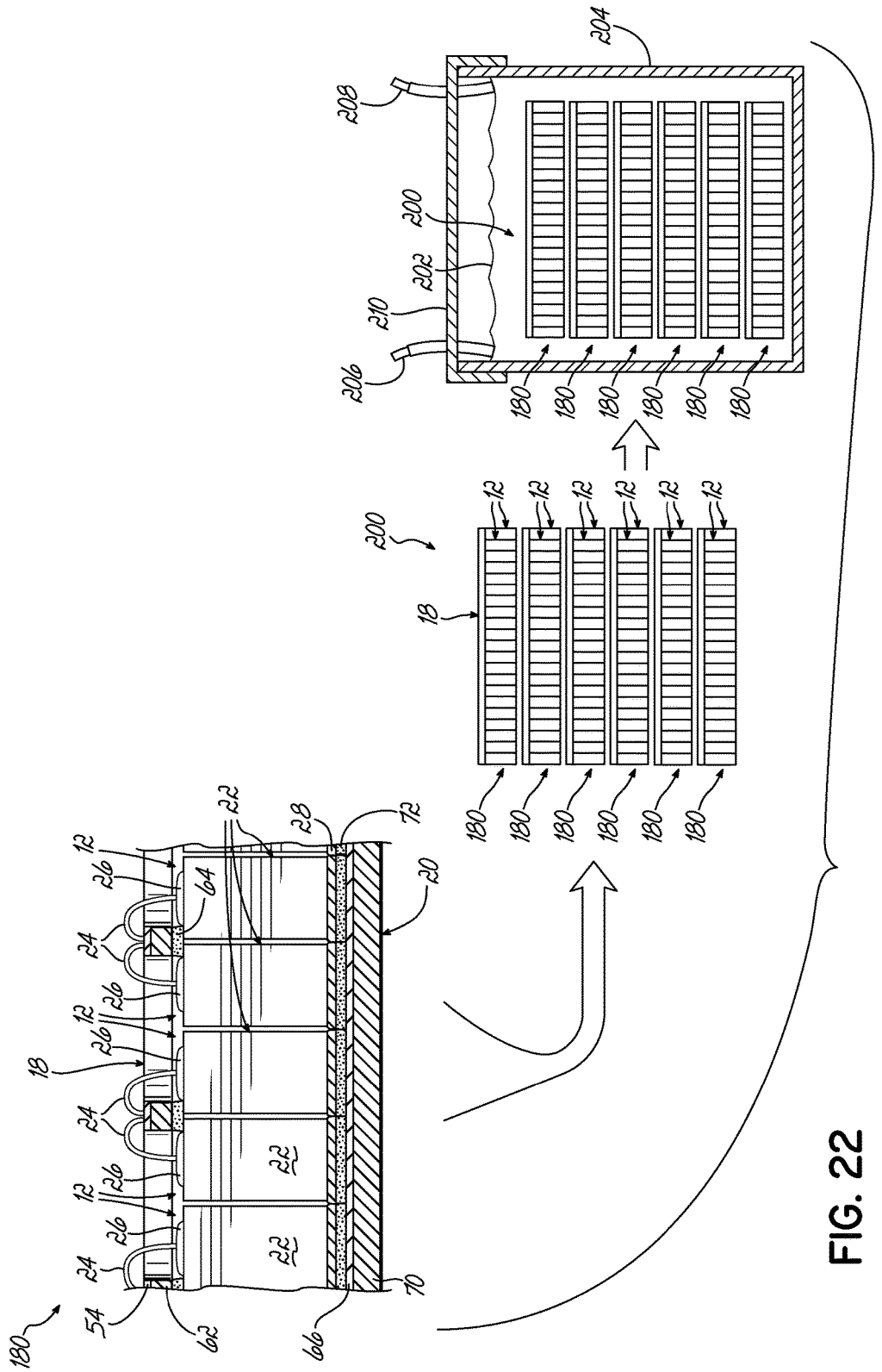
FIG. 22 is a elevation view of one embodiment of the invention including an energy storage assembly.

With continued reference to FIG. 22, in one embodiment, the energy storage assembly 200 may be submerged in a dielectric fluid 202 within a container 204. Electrodes 206 and 208 may extend through a lid 210 and electrically connect the energy storage assembly 200, to other assemblies, or to an electrical circuit (not shown). By way of example only and not limitation, the dielectric fluid 202 may be FC40 commercially available from Galden, a similar dielectric fluid from 3M, or a silicone oil. Alternatively, instead of the dielectric fluid 202, the silicone rubber, described above, may be used. While not shown in FIG. 22, a layer of non-conductive material, such as the layer 110 shown in FIG. 15 and described above, may be positioned between each of the modules 180 in the stack of module shown in FIG. 22.

In one embodiment of the present invention and with reference now to FIG. 23, multiple string modules 158 (shown in FIG. 23A) may be electrically connected between two conductors 212, 214 to form a pulse forming network 216. The conductors 212, 214 may be made of copper or silver with the modules 158 soldered to the conductors 212 and 214 at either end. Pulse forming networks are capable of providing large amounts of energy over a short, but useful, amount of time. Generally, the power output is a square wave of energy rather than a single peak of maximum energy that may be provided by a capacitor. The dimension of the pulse forming network 216 may be about 0.5 m long, about 1 m long, or about 10 m long. Other lengths are possible. It will be appreciated that pulse forming networks of longer lengths can supply a longer energy pulse to a device being powered by the pulse forming network. Exemplary devices to be powered by the pulse forming network 216 include, for example, directed energy weapons and high-energy research devices.

In view of the "graceful" failure of the capacitor assemblies 12 as described above, for a pulse forming network 216 with hundreds of strings 158 over, for example, a three meter long pulse forming network, if one of the capacitors 22 fails, the overall power loss is negligible, and the pulse forming network 216 may continue to operate. That is, a single failure of a capacitor does not result in a catastrophic failure of the pulse forming network 216.

In another embodiment, and with reference to FIGS. 24 and 24A, a pulse forming network 220 may include a plurality of panel modules 166 (shown in FIG. 20) electrically connected to two conductors 222, 224, which may be made of copper or silver, as described above, by soldering the conductors 162, 164 to the conductors 222, 224, respectively. For 1,000 V capacitors, if each of the panel modules 166 is one hundred capacitors 22 wide by 100 rows of capacitors 22 tall, each panel 166 may be rated to 100,000 V. It will be appreciated that other module configurations, such as those described above; other capacitor configurations; and other voltage ratings, for example, 1,500 V capacitors, may be utilized according to embodiments of the invention. Similar to the pulse forming network 216, above, failure of any single capacitor does not result in catastrophic failure of the pulse forming network 220.

Figure 25:
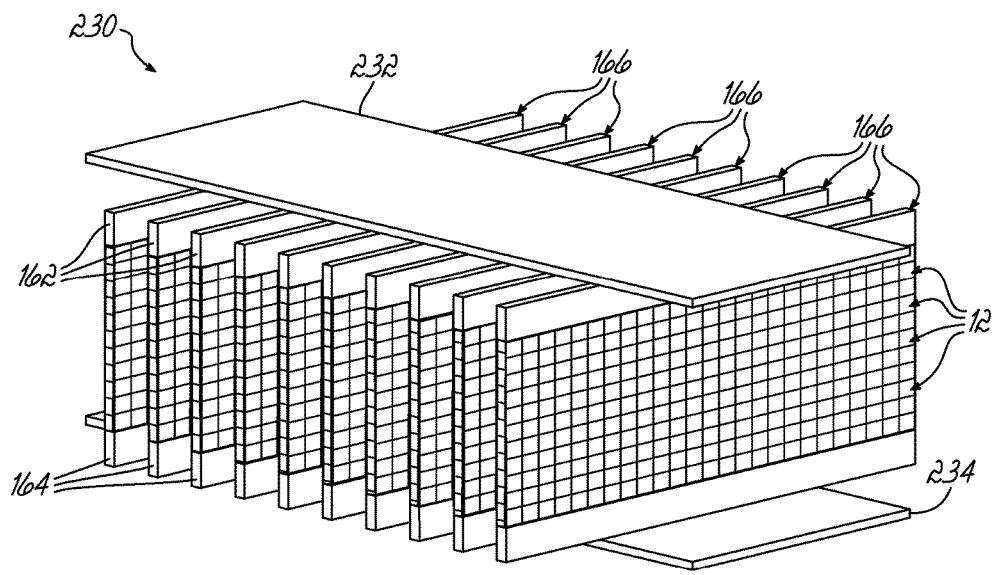
FIG. 25 is a perspective view of a pulse forming network according to one embodiment of the invention.

In another embodiment, and with reference to FIG. 25, the panels 166 or other modules described above may be electrically connected between two conductors 232 and 234 to form a pulse forming network 230. As shown, the panels 166 may be oriented perpendicularly to the conductors 232 and 234. It will be appreciated that more panels 166 may be attached per unit length in this configuration. If the voltage per panel 166 is maintained, that is, 1,000 V per panel, then the coulombs per length would increase. Thus, this configuration produces greater energy per unit length of the conductors 232 and 234. It is contemplated that this configuration may produce a cleaner, more consistent square wave of energy because each conductor 162, 164 of each panel 166 is soldered, for example, to a single point on the conductors 232 and 234.

In another aspect, embodiments of the invention include manufacturing the capacitor assemblies, modules, energy storage assemblies, and pulse forming networks described above. To that end, after manufacturing capacitors according to methods known in the art, the capacitors are screened. Screening includes selecting the capacitors that exhibit high voltage breakdown strength while removing those capacitors that do not exhibit at least a predetermined voltage breakdown strength.

Figure 26:
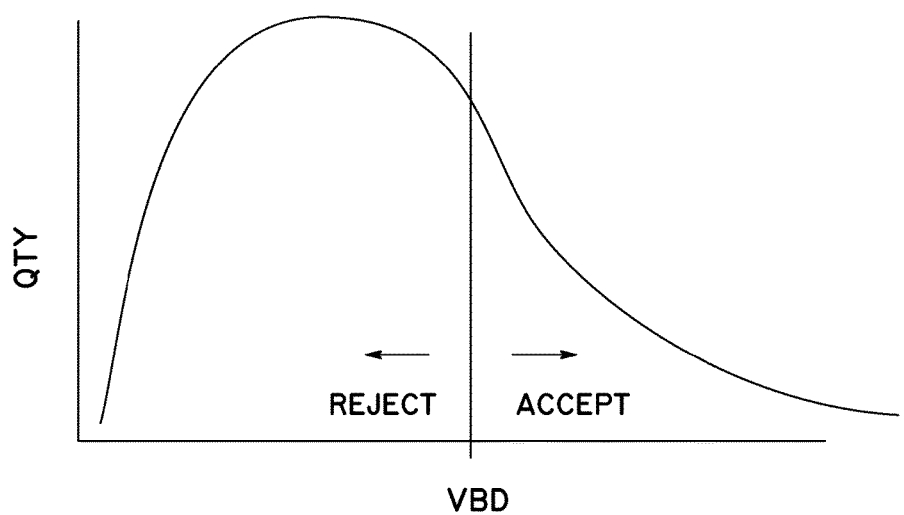
FIG. 26 is a schematic illustration of a distribution of voltage breakdown for a population of capacitors.

With reference to FIG. 26, a distribution of voltage breakdown for a population of capacitors is shown. The distribution may be a bell curve or a log-normal type distribution that is positively skewed. According to embodiments of the invention, the predetermined minimum voltage breakdown may be set such that only a few of the capacitors exhibit high voltage breakdown.

As shown in FIG. 26, screening includes accepting certain capacitors that exhibit a voltage breakdown greater than the predetermined minimum while rejecting capacitors that do not meet the minimum voltage breakdown. The capacitors that are rejected are excluded from being incorporated into a module according to embodiments of the invention. In other words, only the capacitors that exhibit a voltage breakdown greater than a predetermined minimum value are included in the manufacturing of modules according to embodiments of the invention. As shown, in one embodiment, more than half of the capacitors are rejected or removed so that they are not included in further manufacturing of embodiments of the present invention. By way of example, if the original distribution of a population of capacitors has an average breakdown strength of 1,000 V and a maximum breakdown of 3,000 V, a predetermined minimum voltage breakdown threshold of 2,000 V may be set. In this example, all of the capacitors are tested to 2,000 V with a DC bias applied to each capacitor. Those capacitors that do not fail are accepted. In the above example, the average power density of the capacitors going into a module would be about four times greater than devices assembled from the original distribution before selection.

In an alternative to the screening method, described above, each capacitor may be rapidly charged and then rapidly discharged. This is referred to as rapid pulsing. In this testing technique, the capacitor is charged to high-voltage, such as, the voltage described above. The charged capacitor is then rapidly discharged. Only capacitors that pass this rapid pulsing test are assembled into modules. The capacitor may be charged and/or discharged at a rate of at least about 100 volts per microsecond (V/µs) in each pulse cycle. Depending on the voltage, charge and/or discharge may take, for example, up to about 3 µsec, and by way of further example, up to about 5 µsec. By way of further example, at least a 300 V/µs charge and/or discharge rate may be utilized. The charge and/or discharge rate may be higher than 300 V/µs, such as, 1000 V/µs or may be slower than 100 V/µs. Rapid pulsing (i.e., charging and discharging) may be repeated multiple times. For instance, each capacitor may be rapidly pulsed at least 10 times. However, embodiments of the present invention are not limited to any specific number of rapid pulse cycles. For example, each capacitor may be rapidly pulsed up to 10,000 times. It will be appreciated that by this rapid pulsing technique, each capacitor is pulsed twice (charged and then discharged) for each cycle and the rate of charge and the rate of discharge may differ from each other.

In one embodiment, and in combination with the rapid pulsing technique described above, the direction of the pulsing may be controlled. Specifically, the polarity during rapid pulsing may be maintained during each pulse cycle. The polarity on the capacitor is not reversed between pulse cycles. By way of example, in one embodiment in which the end terminal 26 is gold, the gold terminal will always be positive during rapid pulse cycles.

In addition to maintaining the polarity during rapid pulse cycles, embodiments of the present invention include assembling the capacitor assemblies into modules in which the polarity on the module is in the same orientation as during rapid pulsing. Continuing the example above in which the end terminal is always positive during rapid pulsing, during assembly the corresponding capacitor assembly is coupled to other capacitor assemblies so that the same end terminal for each of the capacitor assemblies is always positive during use of the module. Without being bound to any theory, it was observed that capacitors may develop asymmetric or directionality during rapid pulse testing. If the polarity subsequent to testing is reversed, it was observed that the capacitor is more likely to fail. For example, a capacitor that passes 10,000 pulse cycles at high-energy in one direction may fail in a single pulse or in less than 10 pulses if the polarity is reversed.

The capacitors that pass screening are assembled into modules. This may include forming end terminals to electrically connect to the internal electrodes. In particular, this may include forming an end terminal onto each opposing end of the capacitor, where the internal electrodes are exposed at opposing ends, or forming terminals on the same end of the capacitor, where the internal electrodes are exposed on the same end of the capacitor.

A wire may then be wire bonded to one of the end terminals. Wire bonding may include creating a region or location designed to fail when exposed to electrical current of predetermined magnitude. Creating a region designed to fail may include creating a location of high electrical resistance between the wire bond and one of the end terminals. This may be achieved by wire bonding a wire of one metallic composition to an end terminal of another metallic composition.

Alternatively, creating a location in the wire bond that is designed to fail may include manipulating the wire prior to or during wire bonding to reduce the cross-sectional area of the wire or inducing strain into the wire at a predetermined location. By way of example, this may include stretching the wire at the predetermined location. By way of further example, manipulating the wire may follow the wire bonding process. After wire bonding, a pull tester may be used to lift and pull the wire loop to create strain at a predetermined location. This may include a partial lifting or partial pulling to create a location of high resistance in the wire bond.

Once wire bonded, the capacitor assemblies formed may be electrically connected in parallel to a main conductor by wire bonding the wire bond to the main conductor. The remaining terminal may be electrically connected to another main conductor to form a module.

Alternatively, the capacitor assemblies may be electrically connected to one another in series. This may include wire bonding the wire bond from one capacitor assembly to an end terminal on another capacitor assembly to form a module. In any of the above, the module may be assembled by maintaining an orientation of the capacitor relative to other capacitors so as to maintain polarity of all of the capacitors from screening.

Once a module is formed, the modules may be electrically coupled together to form an energy storage assembly for a pulse forming network.

Further details and embodiments of the invention will be described in the following examples.

Examples

Figure 27:
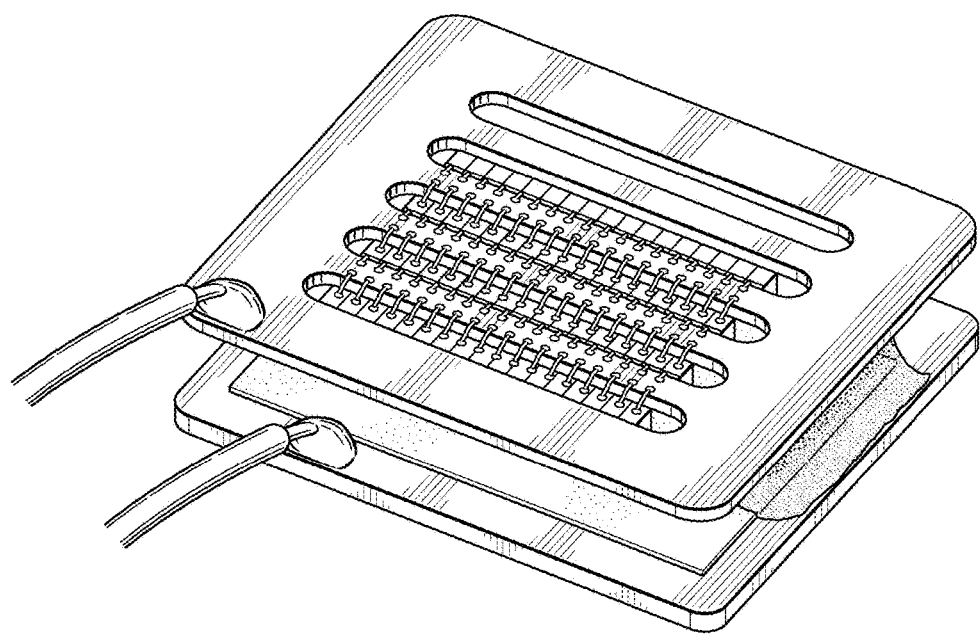
FIG. 27 is a schematic illustration of a module according to one embodiment of the invention.
Figure 28:
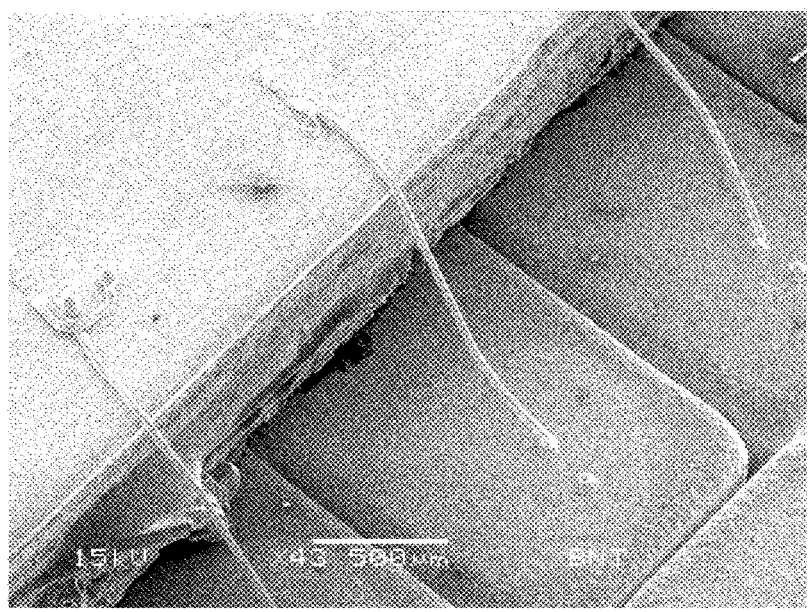
FIG. 28 is a SEM photomicrograph of a capacitor assembly according to one embodiment of the invention.

With reference now to FIGS. 27 and 28, a module that was constructed in accordance with an embodiment of the invention is shown. The module includes an array of capacitors placed close to each other on a bottom conductor plate. The capacitor assemblies are shown exposed through channels in the top conductor plate (shown best in FIG. 28). A layer of conductive epoxy secured the capacitors to the bottom conductor plate. The capacitor assemblies were wire bonded to the top conductor plate. In the module shown, approximately 200 capacitors were arranged in parallel. As is shown in FIG. 28, each of the capacitors includes an end terminal made of gold, which is observed as a lighter colored area on the end of each capacitor and to which the wire bond is attached. Although not shown in the photographs, the opposing end terminal is formed of a palladium silver compound which is bonded in the conductive epoxy. The capacitors were size 1210, capacitance 10 nF operating at 1,000 V using Class 1 K-80 material. Each capacitor was about 0.18 inch tall, 0.012 inch wide, and 0.03 inch thick. The blackened area on the module in FIG. 26 is the result of wire bond failures described below.

All of the capacitors were screened before assembly. In particular, each capacitor was pulse screened more than 100 times at greater than 300 v/µsec at about 20 cycles per second. In particular, each capacitor was tested for breakdown up to a desired level, in this case about 1000V. Charge time was approximately 10 msec. and discharge time was below 10 µsec. Capacitors that failed to remove from the population before assembly of the module.

The module was tested in air, that is, the module was not submerged in dielectric fluid. During testing of the module and with reference to FIGS. 29A-29C and 30, an oscilloscope was used to monitor the peak voltage during voltage cycling. The test setup is shown in FIG. 30 with the oscilloscope shown in the center, a pulsing power supply shown on the left, and a Forward Looking Infrared (FLIR) thermal imaging camera on the right. The FLIR camera captured the thermal image during wire bond failures.

Figure 29A:
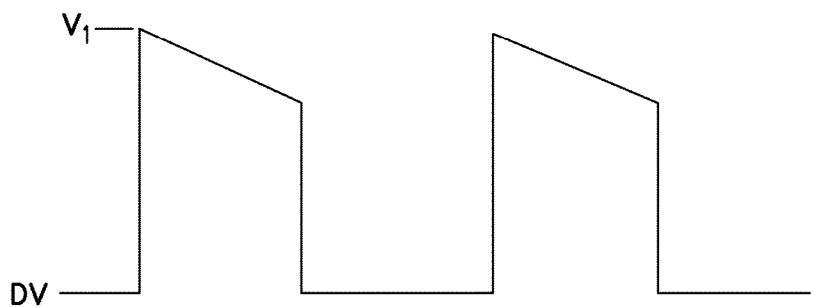
FIGS. 29A, 29B, and 29C are graphical representations of voltages observed during testing of a module according to one embodiment of the invention.
Figure 29B:
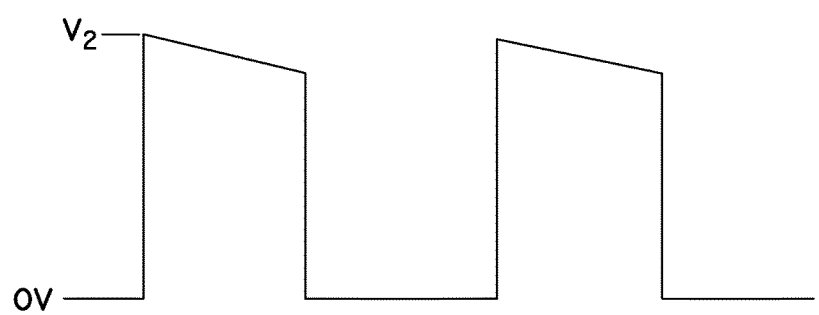
Figure 29C:
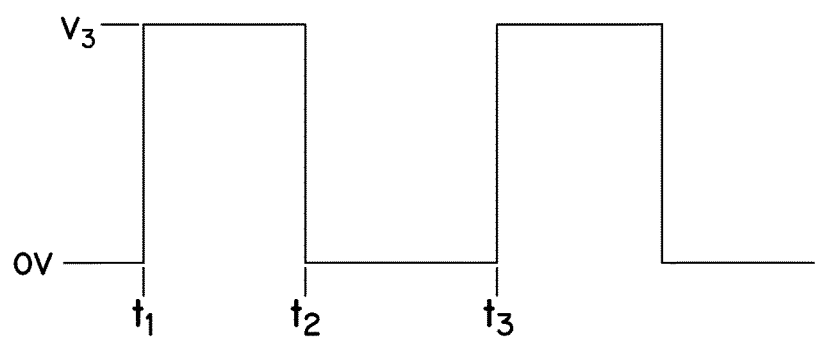
Figure 30:
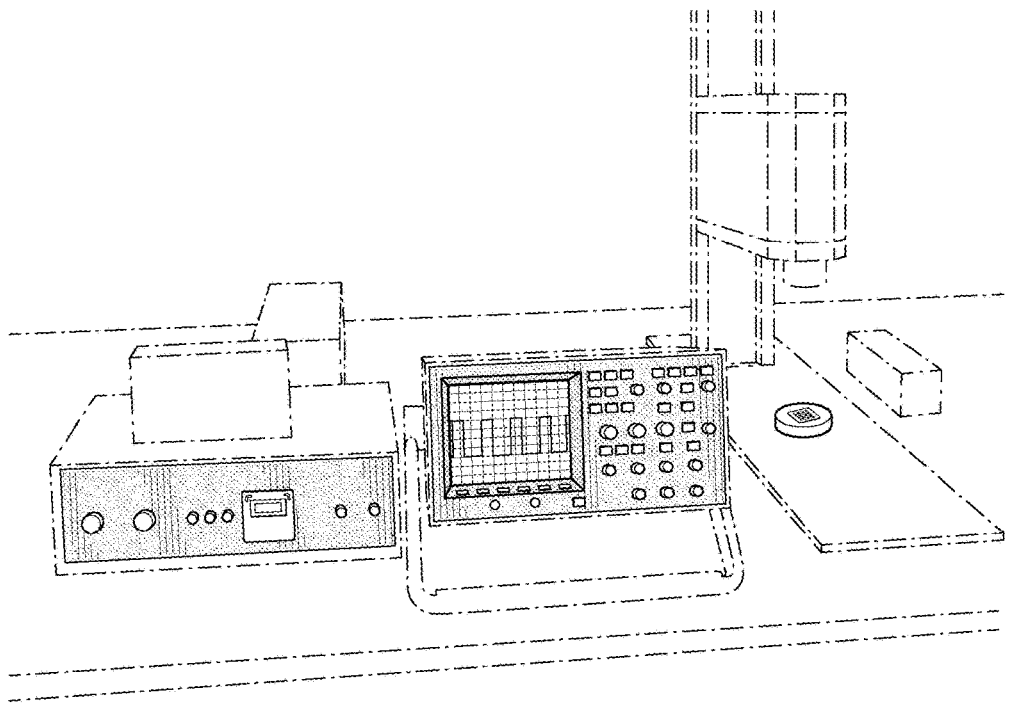
FIG. 30 is a schematic illustration of test equipment utilized for testing modules according to embodiments of the invention.

In FIGS. 29A-29C, the voltage is shown on the y-axis and time is shown on the x-axis. On and off time are approximately 50 ms each. With reference to FIG. 29A, the module (shown in FIG. 27) was pulsed at approximately 200 V ($V_1$). As shown, the voltage degraded during voltage on-time. Degradation in the peak voltage was believed to be due to a leaky capacitor.

Figure 31:
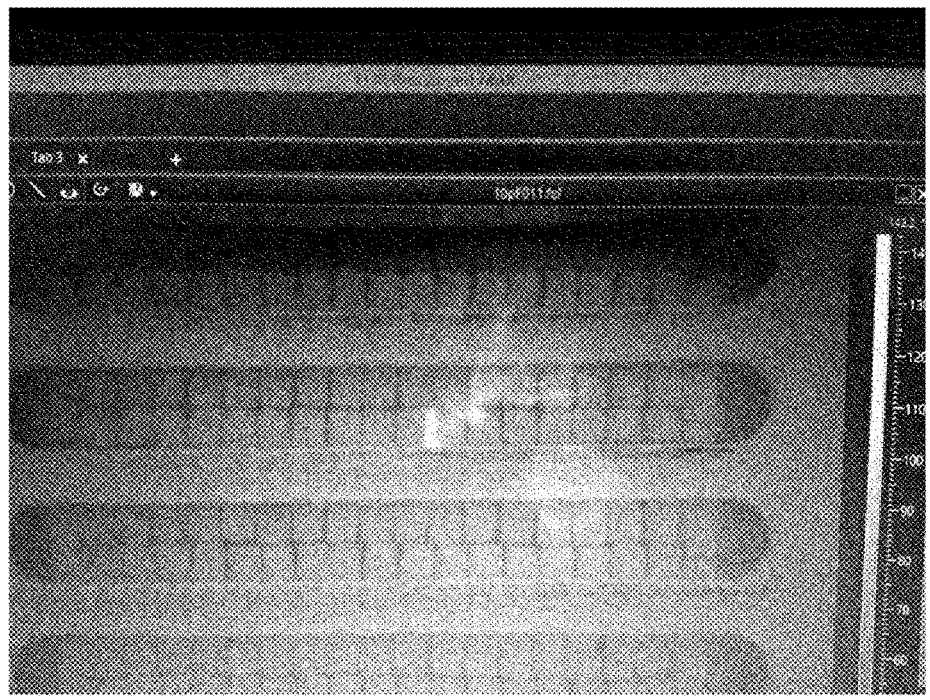
FIG. 31 is a thermal image of a capacitor failure during testing according to one embodiment of the invention.

As the voltage was increased to 500 V ($V_2$) and with reference to FIG. 29B, one of the capacitors failed. That failure was accompanied by a loud noise and bright flash of light believed to be due to the failure of a wire bond. The FLIR captured the thermal image of the wire bond failure. See FIG. 31 in which the capacitor is near the moment in time that its wire bond failed. The white spot between the two capacitors near the center of the photo is a result of the heat generated by the wire bond failure. The oscilloscope at 500 V is shown in FIG. 29B after the failure of the capacitor. There was still a leaking capacitor in the module which is evidenced by the gradual decrease in the voltage during voltage on-time in FIG. 29B.

Again, voltage was further increased. This time to 1,000 V ($V_3$). During the increase, another capacitor failed. As is shown in FIG. 29C, at 1,000 V, no degradation in voltage was observed during voltage on-time. These results demonstrate that the module was capable of graceful failure of individual capacitors while maintaining high energy storage capability.

Figure 32A:
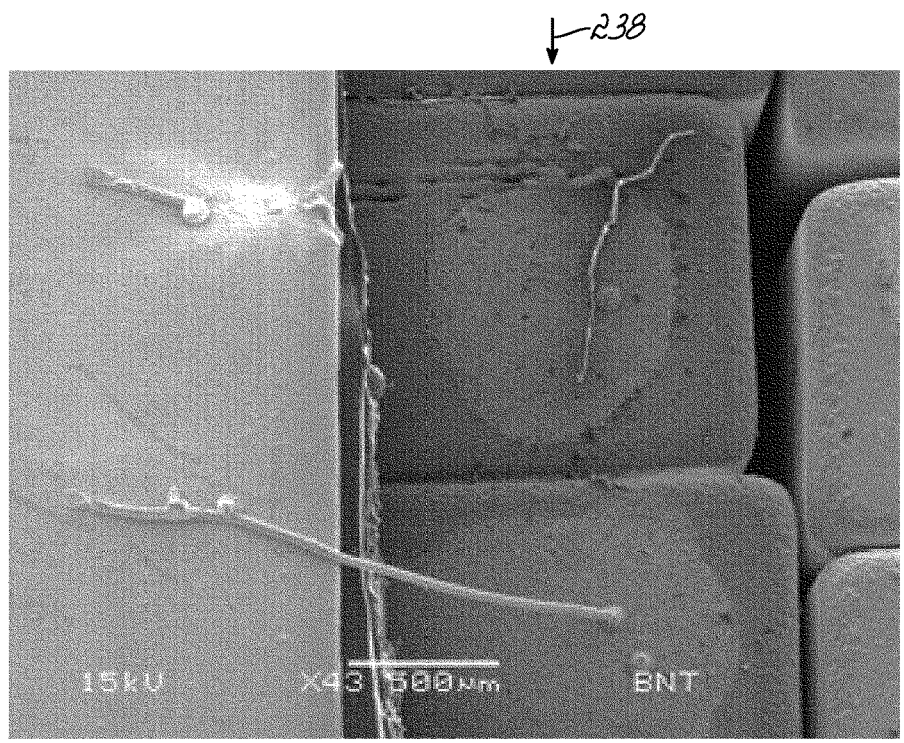
FIGS. 32A and 32B are SEM photomicrographs of failed capacitor assemblies.
Figure 32B:
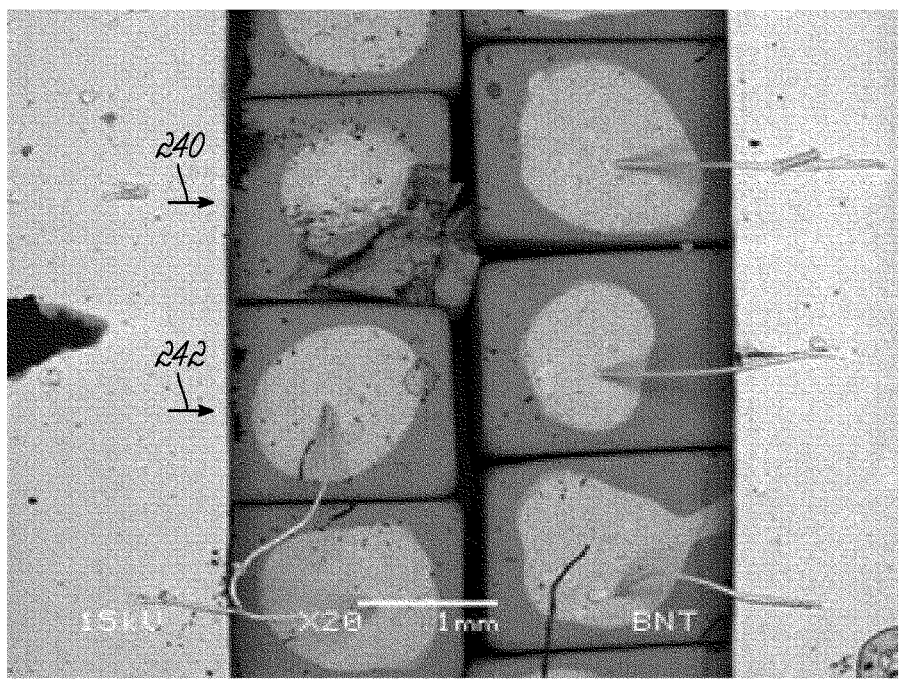

FIGS. 32A and 32B are exemplary SEM photomicrographs of failed capacitors. FIG. 32A depicts the wire bond failure in which the wire bond failed in the upper capacitor assembly (indicated by arrow 238) while the wire bond in the lower adjacent capacitor assembly remained intact. In FIG. 32B, the capacitor indicated by arrow 240 failed. In this case, the wire bond failed and the capacitor fractured, as shown. Note that the fracture propagated to the side of the capacitor but did not extend to or affect adjacent capacitors. It also appears that the adjacent wire bond failed as is indicated by arrow 242 while remaining wire bonds on adjacent capacitor assemblies remained intact and operational.

Figure 33:
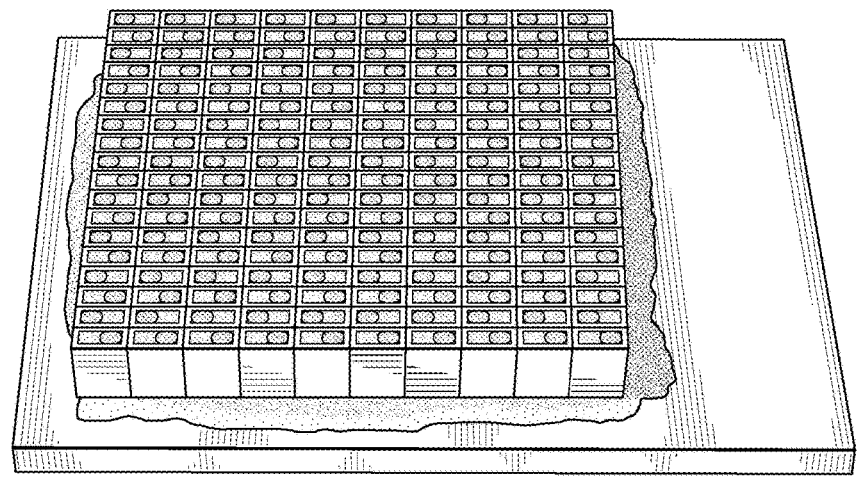
FIG. 33 is a schematic illustration of a partially constructed module according to one embodiment of the invention.
Figure 34:
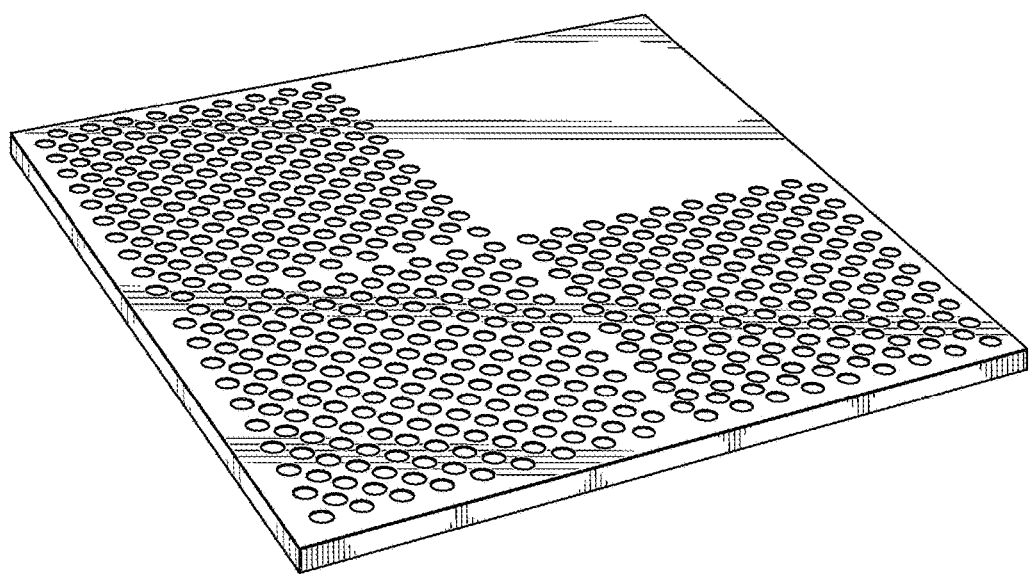
FIG. 34 is schematic illustration of a top main conductor according to one embodiment of the invention.

Another module was constructed and is shown in a partially constructed condition in FIG. 33. The module is shown without a top conductor or wire bonds connected to the capacitors. The individual capacitors are stacked in an array of 10 capacitors wide by 18 capacitors deep. The end terminals are gold as is evident by the gold dot on the top surface of each capacitor. The capacitors are arranged so that the gold end terminals on adjacent capacitors are staggered. The individual capacitors also have electrodes that extend to the end of the capacitor as evidenced by the gray/black area adjacent the gold end terminal. The electrodes of the capacitors are palladium silver and silver and so appear dark in the photo. A top main conductor for the arrangement of capacitors shown in FIG. 33 is shown in FIG. 34. As shown in the photograph, the openings through which the wire bonds are to pass are staggered to match the staggered arrangement of the gold end terminals shown in FIG. 33.

Figure 35:
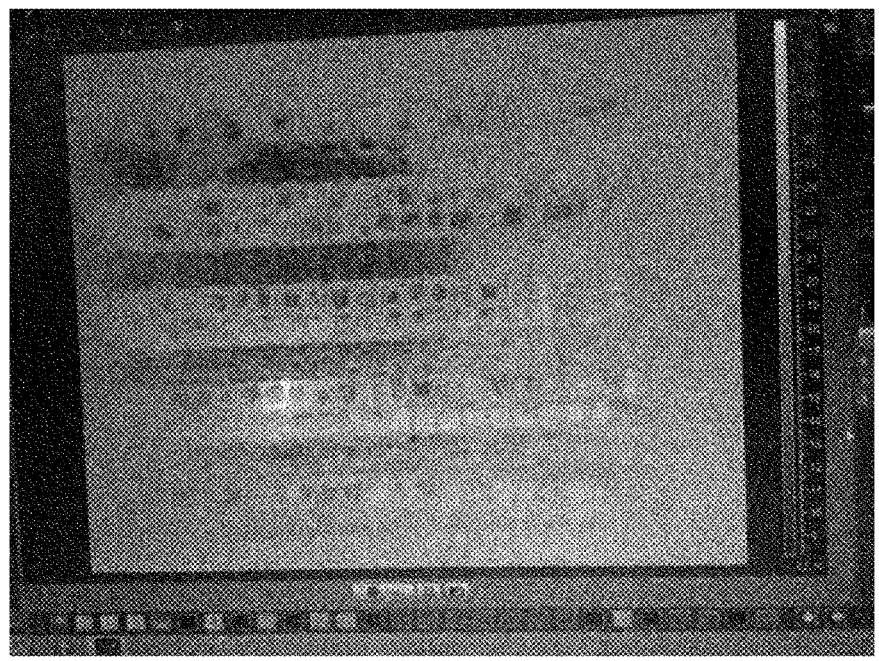
FIG. 35 is a thermal image of a capacitor failure during testing according to one embodiment of the invention.

Another module was tested similar to the test described above with regard to the module shown in FIGS. 27 and 28. With reference to FIG. 35, thermal imaging of the module during pulsing illustrates a chip failure as indicated by arrow 244. The capacitor surrounded by the bright or light colored halo was failing at the time of the photo.

Figure 36:
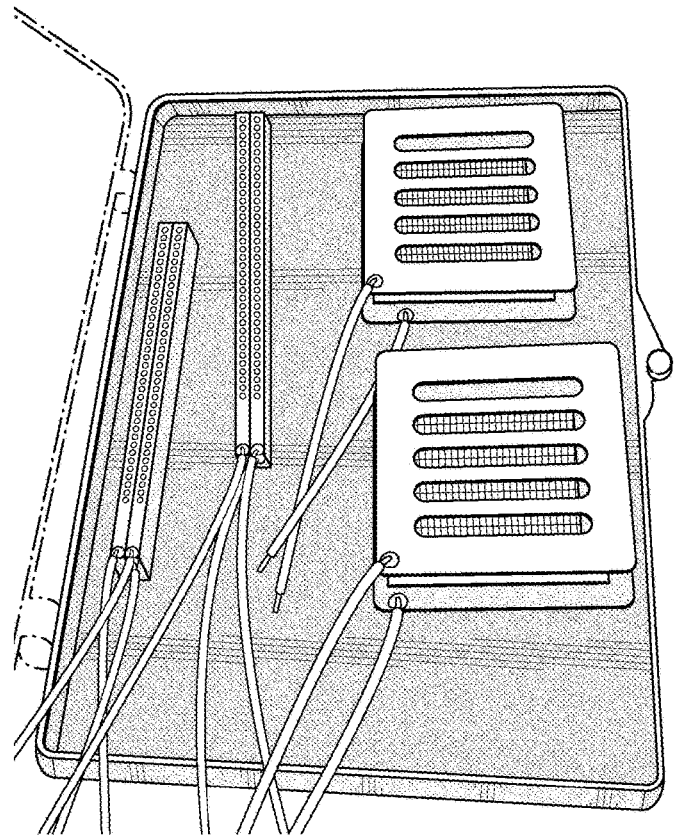
FIG. 36 is a schematic illustration of a variety of modules according to embodiments of the invention.
Figure 37:
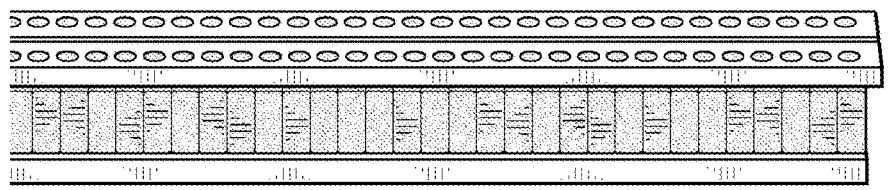
FIG. 37 is an up-close schematic illustration of one string panel of the modules shown in FIG. 36.
Figure 38:
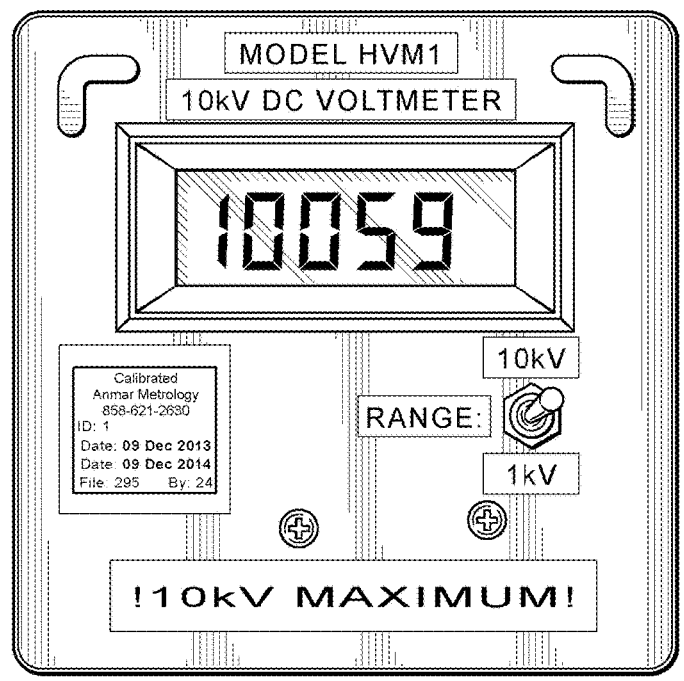
FIGS. 38-42 are schematic illustrations of a test setup for testing an energy storage assembly according to embodiments of the invention.

FIG. 36 is a photograph of various modules, two of which are stick assemblies (shown magnified in FIG. 37) and two of which are panel modules similar to that shown in FIG. 27.

Figure 42:
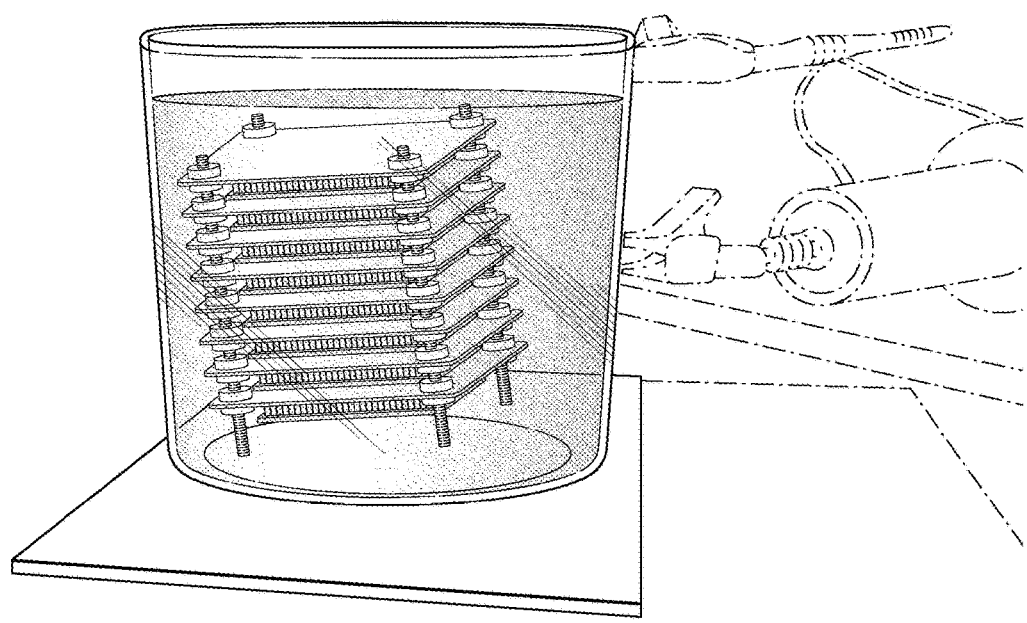

With reference to FIGS. 38-43, an energy storage assembly was also constructed in accordance with embodiments of the invention. The assembly is shown in FIGS. 42 and 43 and includes a stack of panels similar to the panels shown in FIG. 27. The assembly shown was submerged in dielectric fluid in a beaker and electrically connected to the test setup as shown.

Figure 39:
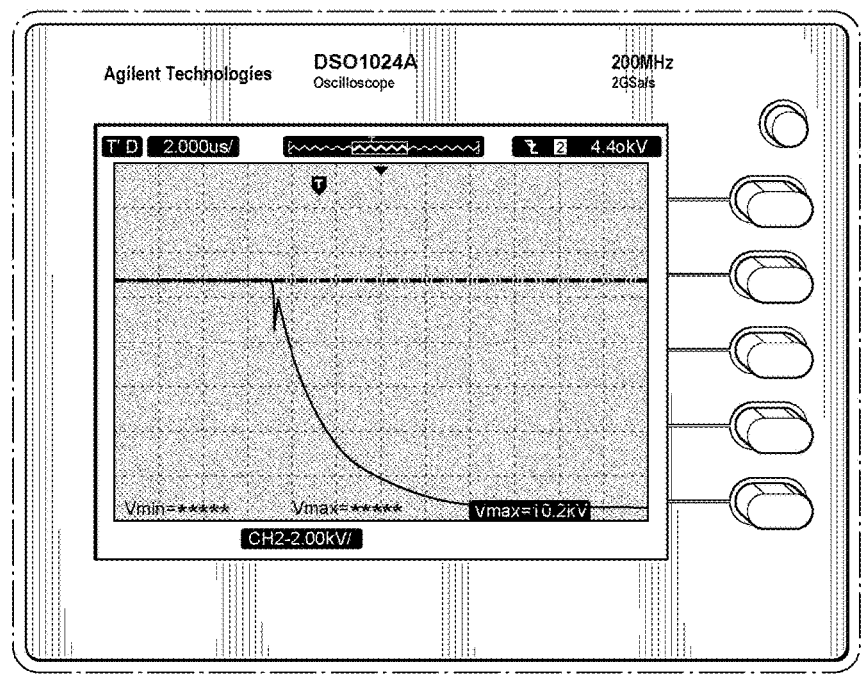
Figure 40:
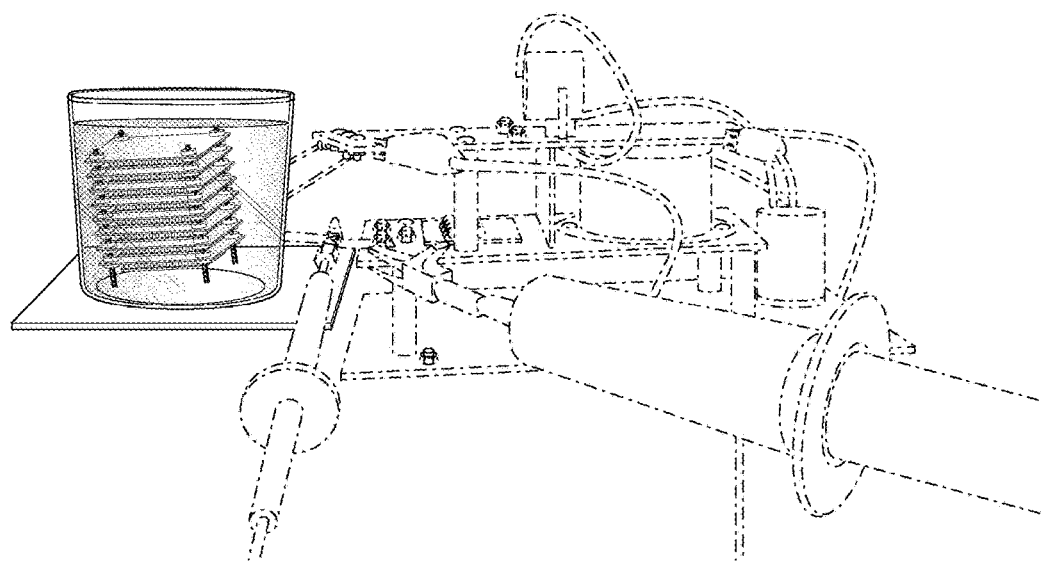
Figure 41:
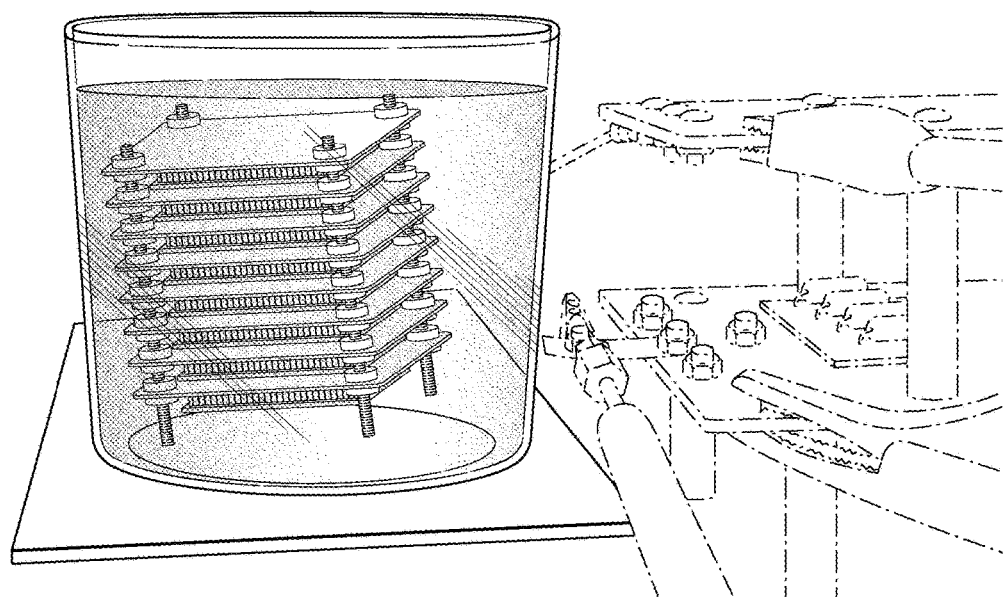

The assembly was successfully pulsed 210 times to 10,000 V as is as generally indicated in FIG. 39. Pulse discharge time was between 5 µsec and 10 µsec. After about 210 pulses, the wire bonds began to fail. Initially, only a few wire bonds failed. As pulsing continued, the rate of failure increased. Over a period of 20 or 30 seconds, the failure of all of the wire bonds was complete.

While the present invention has been illustrated by a description of various embodiments and while these embodiments have been described in some detail, it is not the intention of the inventor to restrict or in any way limit the scope of the appended claims to such detail. Thus, additional advantages and modifications will readily appear to those of ordinary skill in the art. The various features of the invention may be used alone or in any combination depending on the needs and preferences of the user.

What is claimed is:

1. A capacitor assembly comprising:
    a capacitor that has a first end and a second end opposing the first end;
    a first terminal that covers less than a total area of the first end;
    a second terminal on one of the first end and the second end; and
    a wire bond that has opposing ends with one end being electrically coupled to the first terminal, the wire bond being configured to break connection with an electrical circuit when an electrical current through the wire bond reaches a fusing current, wherein the first terminal is made of a first conductive material and the second terminal is made of a second conductive material that is different than the first conductive material.

2. The capacitor assembly of claim 1 wherein the first terminal is made of gold or an alloy including gold and the second terminal does not include gold.

3. The capacitor assembly of claim 1 wherein at least the first terminal is free of solder.

4. The capacitor assembly of claim 1 wherein the capacitor has at least one external side extending between the first and second ends and the second terminal covers the second end and extends on to the at least one external side of the capacitor.

5. The capacitor assembly of claim 1 wherein the capacitor has at least one external side extending between the first and second ends, and wherein a margin is formed between the first terminal and the at least one external side, the margin being free of electrically conductive material.

6. The capacitor assembly of claim 1 wherein the wire bond is made of gold or an alloy including gold.

7. The capacitor assembly of claim 1 wherein the wire bond has a substantially circular cross-section having a diameter of about 50 microns or less.

8. The capacitor assembly of claim 1 wherein the wire bond is free-floating between the first terminal and the electrical connection to the electrical circuit.

9. The capacitor assembly of claim 1 wherein the wire bond has a region of increased resistance, the wire bond being configured to separate at the region of increased resistance.

10. The capacitor assembly of claim 9 wherein the region includes a reduced cross-sectional area.

11. The capacitor assembly of claim 9 wherein the region includes an area of increased strain.

12. The capacitor assembly of claim 1 wherein the capacitor includes at least one dielectric layer and at least two electrodes that are separated by the dielectric layer, at least one of the electrodes being exposed at the first end, and wherein the other electrode is exposed at the second end and the second terminal is electrically coupled to the other electrode on the second end.

13. The capacitor assembly of claim 1 wherein the capacitor includes at least one dielectric layer and at least two electrodes that are separated by the dielectric layer, each of the electrodes being exposed at the first end, and wherein the second terminal is electrically coupled to the other electrode on the first end.

14. The capacitor assembly of claim 1 wherein the capacitor is capable of containing at least 0.001 Joules of energy when charged to 1,000V.

15. The capacitor assembly of claim 1 wherein the capacitor is from about 0.08 inch by about 0.05 inch to about 0.22 inch by about 0.20 inch.

16. An energy storage module comprising:
at least one hundred capacitor assemblies of claim 1 spaced apart side to side less than 0.005 inch;
a first main conductor, each of the wire bonds is directly coupled to the first main conductor; and
a second main conductor, each of the second terminals of the capacitor assemblies being directly coupled to the second main conductor.

17. An energy storage module comprising:
at least two capacitor assemblies of claim 1, wherein the wire bond of one capacitor assembly is electrically connected to the second terminal of an adjacent capacitor assembly.

18. An energy storage module comprising:
at least two capacitor assemblies comprising:
a capacitor that has a first end and a second end opposing the first end;
a first terminal that covers less than a total area of the first end;
a second terminal on one of the first end and the second end; and
a wire bond that has opposing ends with one end being electrically coupled to the first terminal, the wire bond being configured to break connection with an electrical circuit when an electrical current through the wire bond reaches a fusing current;
a first main conductor, each of the wire bonds being directly coupled to the first main conductor; and
a second main conductor, each of the second terminals of the capacitor assemblies being directly coupled to the second main conductor,
wherein the at least two capacitor assemblies each have at least one external side extending between the respective first and second ends thereof and the at least one external side of one capacitor assembly is in direct contact with the at least one external side of the other capacitor assembly.

19. The energy storage module of claim 18 wherein the first main conductor includes a plate having a first side and a second side, the wire bond for each of the capacitor assemblies being directly coupled to the second side.

20. The energy storage module of claim 19 wherein the plate includes a channel that extends through the thickness thereof from the first side to the second side and the wire bond for each of the capacitor assemblies extends through the channel and is directly connected to the second side.

21. The energy storage module of claim 19 wherein the plate includes at least two spaced apart openings that each extend through the thickness thereof from the first side to the second side and the wire bond for each of the capacitor assemblies extends through a respective opening and is directly connected to the second side.

22. The energy storage module of claim 21 wherein the capacitor assemblies are arranged in a row and adjacent ones of the at least two spaced apart openings are arranged in a row that is parallel to the row of capacitor assemblies.

23. The energy storage module of claim 21 wherein the capacitor assemblies are arranged in a row with respective first terminals of adjacent capacitor assemblies being offset from one another and adjacent ones of the at least two spaced apart holes are offset from one another to match the offset arrangement of the first terminals.

24. The energy storage module of claim 18 further comprising:
a layer of porous, non-conductive material in direct contact with at least the first main conductor.

25. The energy storage module of claim 24 wherein the layer of non-conductive material is a layer of non-conductive ceramic fibers.

26. The energy storage module of claim 18 further comprising:
a dielectric fluid,
wherein the capacitor assemblies and the first main conductor are submerged in the dielectric fluid.

27. An energy storage assembly comprising:
at least two energy storage modules that are stacked one on top of the other, each of the at least two energy storage modules comprising:
at least two capacitor assemblies comprising:
a capacitor that has a first end and a second end opposing the first end;
a first terminal that covers less than a total area of the first end;

a second terminal on one of the first end and the second end; and
a wire bond that has opposing ends with one end being electrically coupled to the first terminal, the wire bond being configured to break connection with an electrical circuit when an electrical current through the wire bond reaches a fusing current;
a first main conductor, each of the wire bonds being directly coupled to the first main conductor; and
a second main conductor, each of the second terminals of the capacitor assemblies being directly coupled to the second main conductor;
a dielectric fluid; and
a container for holding the dielectric fluid, the at least two energy storage modules being submerged in the dielectric fluid.

28. The energy storage assembly of claim 27 wherein the at least two energy storage modules are separated by a layer of porous, non-conductive material.

29. The energy storage assembly of claim 27 wherein the at least two energy storage modules are electrically connected together in series in an electrical circuit.

30. A pulse forming network comprising:
a first primary conductor;
a second primary conductor; and
at least two energy storage modules of claim 18, the first main conductor of each energy storage module being electrically connected to the first primary conductor and the second main conductor of each energy storage module being electrically connected to the second primary conductor.

31. A capacitor assembly comprising:
a capacitor that has a first end and a second end opposing the first end;
a first terminal that covers less than a total area of the first end;
a second terminal on one of the first end and the second end; and
a wire bond that has opposing ends with one end being electrically coupled to the first terminal, the wire bond being configured to break connection with an electrical circuit when an electrical current through the wire bond reaches a fusing current,
wherein the wire bond is made of a first conductive material and the first terminal is made of a second conductive material different than the first material.

32. An energy storage module comprising:
at least two capacitor assemblies comprising:
a capacitor that has a first end and a second end opposing the first end;
a first terminal that covers less than a total area of the first end;
a second terminal on one of the first end and the second end; and
a wire bond that has opposing ends with one end being electrically coupled to the first terminal, the wire bond being configured to break connection with an electrical circuit when an electrical current through the wire bond reaches a fusing current;
a first main conductor, each of the wire bonds being directly coupled to the first main conductor; and
a second main conductor, each of the second terminals of the capacitor assemblies being directly coupled to the second main conductor,
wherein the at least two capacitor assemblies each have at least one side extending between the respective first and second ends thereof and the side of one capacitor assembly is spaced apart from the side of an adjacent capacitor assembly by from about 0.0005 inch to about 0.005 inch.

33. An energy storage module comprising:
at least two capacitor assemblies comprising:
a capacitor that has a first end and a second end opposing the first end;
a first terminal that covers less than a total area of the first end;
a second terminal on one of the first end and the second end; and
a wire bond that has opposing ends with one end being electrically coupled to the first terminal, the wire bond being configured to break connection with an electrical circuit when an electrical current through the wire bond reaches a fusing current;
a first main conductor, each of the wire bonds being directly coupled to the first main conductor;
a second main conductor, each of the second terminals of the capacitor assemblies being directly coupled to the second main conductor; and
a layer of porous, non-conductive material in direct contact with at least the first main conductor.

34. An energy storage module comprising:
at least two capacitor assemblies comprising:
a capacitor that has a first end and a second end opposing the first end;
a first terminal that covers less than a total area of the first end;
a second terminal on one of the first end and the second end; and
a wire bond that has opposing ends with one end being electrically coupled to the first terminal, the wire bond being configured to break connection with an electrical circuit when an electrical current through the wire bond reaches a fusing current;
a first main conductor, each of the wire bonds being directly coupled to the first main conductor;
a second main conductor, each of the second terminals of the capacitor assemblies being directly coupled to the second main conductor; and
a dielectric fluid,
wherein the capacitor assemblies and the first main conductor are submerged in the dielectric fluid.

35. An energy storage assembly comprising:
at least two energy storage modules that are stacked one on top of the other, each of the at least two energy storage modules comprising:
at least two capacitor assemblies comprising:
a capacitor that has a first end and a second end opposing the first end;
a first terminal that covers less than a total area of the first end;
a second terminal on one of the first end and the second end; and
a wire bond that has opposing ends with one end being electrically coupled to the first terminal, the wire bond being configured to break connection with an electrical circuit when an electrical current through the wire bond reaches a fusing current;
a first main conductor, each of the wire bonds being directly coupled to the first main conductor; and
a second main conductor, each of the second terminals of the capacitor assemblies being directly coupled to the second main conductor, wherein the at least two energy storage modules are separated by a layer of porous, non-conductive material.

36. A pulse forming network comprising:
a first primary conductor;
a second primary conductor; and
at least two energy storage modules of claim 32, the first main conductor of each energy storage module being electrically connected to the first primary conductor and the second main conductor of each energy storage module being electrically connected to the second primary conductor.

37. A pulse forming network comprising:
a first primary conductor;
a second primary conductor; and
at least two energy storage modules of claim 33, the first main conductor of each energy storage module being electrically connected to the first primary conductor and the second main conductor of each energy storage module being electrically connected to the second primary conductor.

38. A pulse forming network comprising:
a first primary conductor;
a second primary conductor; and
at least two energy storage modules of claim 34, the first main conductor of each energy storage module being electrically connected to the first primary conductor and the second main conductor of each energy storage module being electrically connected to the second primary conductor.

* * * * *